United States Patent
Hu et al.

(10) Patent No.: US 12,120,023 B2
(45) Date of Patent: Oct. 15, 2024

(54) BIER OAM DETECTION METHOD, DEVICE, AND SYSTEM

(71) Applicant: Huawei Technologies Co., Ltd., Shenzhen (CN)

(72) Inventors: Jing Hu, Nanjing (CN); Wei Yi, Nanjing (CN); Jingrong Xie, Beijing (CN); Ju Wang, Beijing (CN); Ting Hua, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/067,232

(22) Filed: Dec. 16, 2022

(65) Prior Publication Data
US 2023/0155933 A1    May 18, 2023

Related U.S. Application Data

(63) Continuation of application No. PCT/CN2021/100692, filed on Jun. 17, 2021.

(30) Foreign Application Priority Data

Jun. 18, 2020 (CN) .......................... 202010564306.5
Aug. 20, 2020 (CN) .......................... 202010845663.9

(51) Int. Cl.
*H04L 45/00* (2022.01)
*H04L 12/46* (2006.01)
*H04L 45/745* (2022.01)

(52) U.S. Cl.
CPC ........ *H04L 45/566* (2013.01); *H04L 12/4633* (2013.01); *H04L 45/745* (2013.01)

(58) Field of Classification Search
CPC . H04L 45/566; H04L 12/4633; H04L 45/745; H04L 45/16; H04L 45/34;
(Continued)

(56) References Cited

U.S. PATENT DOCUMENTS 10,313,216 B2 * 6/2019 Zheng ..................... H04L 43/00
2012/0063314 A1 * 3/2012 Pignataro ............ H04L 12/4633
370/235

(Continued)

FOREIGN PATENT DOCUMENTS

CN    105812197 A    7/2016
CN    107147508 A    9/2017
(Continued)

OTHER PUBLICATIONS

N. Kumar et al, "BIER Ping and Trace" draft-ietf-bier-ping-07, Network Work group, Internet-Draft, May 11, 2020, 49 pages.
(Continued)

*Primary Examiner* — Oanh Duong
(74) *Attorney, Agent, or Firm* — Conley Rose, P.C.

(57) ABSTRACT

A bit index explicit replication (BIER) operations, administration, and maintenance (OAM) detection method includes a bit forwarding ingress router (BFIR) obtaining a detection request packet based on a first BIER OAM packet, and sending the detection request packet to at least one bit forwarding egress router BFER. The detection request packet includes a first packet and a first packet header. The first packet is a packet obtained by encapsulating the first BIER OAM packet. The first packet header includes a bit string, and the bit string indicates the at least one bit forwarding egress router BFER that is to be measured.

20 Claims, 13 Drawing Sheets

(58) Field of Classification Search
CPC ..... H04L 43/10; H04L 45/741; H04L 69/164; H04L 69/22; H04L 49/3009; H04L 45/54; H04L 9/40

See application file for complete search history.

(56) References Cited

U.S. PATENT DOCUMENTS

| | | | |
|---|---|---|---|
| 2014/0092751 A1* | 4/2014 | Meilik | H04L 41/0213 |
| | | | 370/241.1 |
| 2017/0126481 A1* | 5/2017 | Pignataro | H04L 45/22 |
| 2017/0302546 A1 | 10/2017 | Zheng et al. | |
| 2020/0067818 A1 | 2/2020 | Jeuk et al. | |
| 2023/0291682 A1* | 9/2023 | Zhu | H04L 45/586 |

FOREIGN PATENT DOCUMENTS

| | | | | |
|---|---|---|---|---|
| CN | 109921987 A | | 6/2019 | |
| CN | 110535675 B | * | 3/2022 | ............ H04L 12/18 |
| EP | 3242441 A1 | | 11/2017 | |
| WO | WO-2016198016 A2 | * | 12/2016 | |

OTHER PUBLICATIONS

X. Xu et al, "BIER Encapsulation," draft-xu-bier-encapsulation-01, Networking Group, Internet-Draft, Oct. 20, 2014, 11 pages.

\* cited by examiner

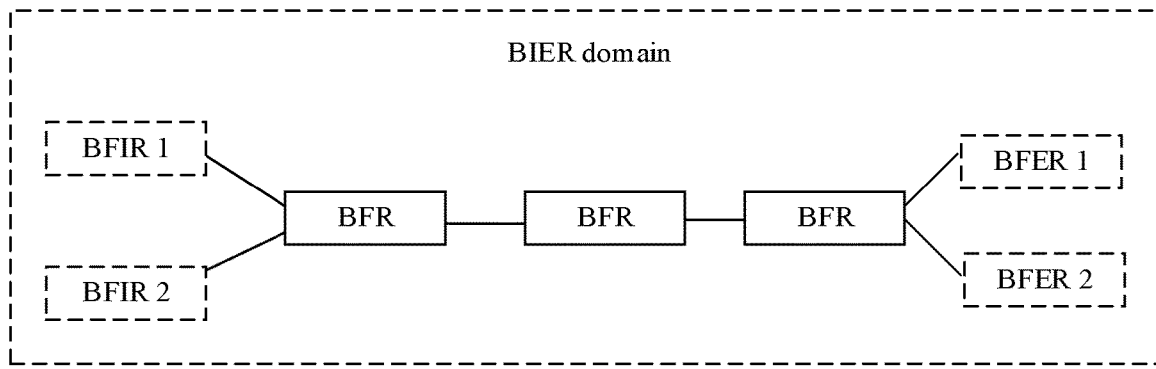

BIER OAM DETECTION METHOD, DEVICE, AND SYSTEM

CROSS-REFERENCE TO RELATED APPLICATIONS

This is a continuation of International Patent Application No. PCT/CN2021/100692 filed on Jun. 17, 2021, which claims priority to Chinese Patent Application No. 202010564306.5 filed on Jun. 18, 2020 and Chinese Patent Application No. 202010845663.9 filed on Aug. 20, 2020. All of the aforementioned patent applications are hereby incorporated by reference in their entireties.

TECHNICAL FIELD

This disclosure relates to the field of network communication, and more specifically, to a bit index explicit replication (BIER) operations, administration, and maintenance (OAM) detection method, a device, and a system.

BACKGROUND

OAM detection refers to detection on network problems. To detect whether a link between devices on a network is normal, a detection request packet may be sent on the network, and a fed-back detection reply packet is used to detect whether the link between the devices on the network is normal.

An Internet Protocol (IP) multicast technology implements efficient point-to-multipoint data transmission in an IP network, so that network bandwidth can be effectively saved, and network load can be reduced. Therefore, a new technology for constructing a multicast data forwarding path is proposed in the industry, and is referred to as a BIER technology. In the technology, a new multicast technology architecture in which a multicast distribution tree does not need to be constructed is provided. How to implement BIER OAM detection in a BIER network becomes a problem to be resolved.

SUMMARY

This disclosure provides a BIER OAM detection method, a bit forwarding ingress router (BFIR), a bit forwarding egress router (BFER), and a system, so as to implement BIER OAM detection in a BIER scenario.

According to a first aspect, a BIER OAM detection method is provided. The method includes: a BFIR obtains a detection request packet based on a first BIER OAM packet, where the detection request packet includes a first packet and a first packet header, the first packet is a packet obtained by encapsulating the first BIER OAM packet, the first packet header includes a bit string, and the bit string indicates at least one bit forwarding egress router BFER that is to be measured. The BFIR sends the detection request packet to the at least one BFER.

It should be understood that the first BIER OAM packet may be a BIER OAM packet that is not encapsulated. The first BIER OAM packet may also be referred to as an original BIER OAM packet.

An identifier carried in a request/reply (req/rep) field in the first BIER OAM packet indicates whether the BIER OAM packet is an OAM request packet or an OAM reply packet. The req field indicates a type (message type) of a request message, and the rep field indicates a type of a reply message.

In the foregoing technical solution, BIER OAM that is not encapsulated or original BIER OAM is encapsulated, so that the method is applicable to more BIER encapsulation scenarios, and BIER OAM detection is implemented in a BIER network.

In a possible implementation, the first packet header includes a first identifier indicating that the encapsulation is IPv6 encapsulation, the first packet includes a first IPv6 header and the first BIER OAM packet, and a destination address of the first IPv6 header is a valid address that can be identified by the at least one BFER.

In another possible implementation, the first packet header includes a first identifier indicating that the encapsulation is IP version 4 (IPv4) encapsulation, the first packet includes a first IPv4 header and the first BIER OAM packet, and a destination address of the first IPv4 header is a valid address that can be identified by the at least one BFER.

In another possible implementation, the first packet header includes a first identifier indicating that the encapsulation is IP version 6 (IPv6) encapsulation, the first packet includes a first IPv6 header and a User Datagram Protocol (UDP) encapsulated BIER OAM packet, a destination address of the first IPv6 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes a first identifier indicating that the encapsulation is IPv4 encapsulation, the first packet includes a first IPv4 header and a UDP encapsulated BIER OAM packet, a destination address of the first IPv4 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes an IPv6 encapsulated BIER header, and the IPv6 encapsulated BIER header includes a second IPv6 header and a first identifier indicating that the encapsulation is IP encapsulation.

The IPv6 encapsulated BIER header includes an outer IPv6 header and an IPv6 extension header, where the IPv6 extension header includes a BIER header or information used to implement BIER forwarding.

The second IPv6 header may be the outer IPv6 header.

In another possible implementation, the first packet header includes a Multiprotocol Label Switching (MPLS) encapsulated BIER header, and the MPLS encapsulated BIER header includes an MPLS label and a first identifier indicating that the encapsulation is IP encapsulation.

The MPLS encapsulated BIER header may be implemented in a plurality of manners. In a possible implementation, the MPLS encapsulated BIER header includes a BIER header, where first four bytes of the BIER header are used to carry the MPLS label. In another possible implementation, the MPLS encapsulated BIER header includes the MPLS label and a BIER header.

In another possible implementation, the first packet header includes an Ethernet encapsulated BIER header, and the Ethernet encapsulated BIER header includes a first identifier indicating that the encapsulation is IP encapsulation.

In another possible implementation, the method further includes: the BFIR receives a detection reply packet from the at least one BFER, where the detection reply packet includes a second packet, and the second packet is a packet obtained by encapsulating a second BIER OAM packet.

An identifier carried in a req/rep field in the second BIER OAM packet indicates whether the BIER OAM packet is an OAM request packet or an OAM reply packet. The req field indicates a type of a request message, and the rep field indicates a type of a reply message.

In another possible implementation, the second packet includes a third IPv6 header and the second BIER OAM packet, and a source address of the third IPv6 header is a valid address that can be identified by the at least one BFER.

In another possible implementation, the second packet includes a second IPv4 header and the second BIER OAM packet, and a source address of the second IPv4 header is a valid address that can be identified by the at least one BFER.

In another possible implementation, the second packet includes a third IPv6 header and a UDP encapsulated BIER OAM packet, a source address of the third IPv6 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the second packet includes a second IPv4 header and a UDP encapsulated BIER OAM packet, a source address of the second IPv4 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the detection reply packet further includes a second packet header, and the second packet header includes a second identifier indicating that the encapsulation is IP encapsulation.

In another possible implementation, the second packet header includes an IPv6 encapsulated BIER header, and the IPv6 encapsulated BIER header includes a second IPv6 header and the second identifier.

In another possible implementation, the second packet header includes an MPLS encapsulated BIER header, and the MPLS encapsulated BIER header includes an MPLS label and the second identifier.

In another possible implementation, the second packet header includes an Ethernet encapsulated BIER header, and the Ethernet encapsulated BIER header includes the second identifier.

According to a second aspect, a BIER OAM detection method is provided. The method includes: a BFER receives a detection request packet from a bit forwarding ingress router BFIR, where the detection request packet includes a first packet and a first packet header, the first packet is a packet obtained by encapsulating a first BIER OAM packet, the first packet header includes a bit string, and the bit string indicates at least one BFER that is to be measured. The BFER obtains a detection reply packet based on the first packet and the bit string, where the detection reply packet includes a second packet, and the second packet is a packet obtained by encapsulating a second BIER OAM packet. The BFER sends the detection reply packet to the BFIR.

An identifier carried in a req/rep field in the second BIER OAM packet indicates whether the BIER OAM packet is an OAM request packet or an OAM reply packet. The req field indicates a type of a request message, and the rep field indicates a type of a reply message.

In a possible implementation, the first packet header includes a first identifier indicating that the encapsulation is IPv6 encapsulation, the first packet includes a first IPv6 header and the first BIER OAM packet, and a destination address of the first IPv6 header is a valid address that can be identified by the at least one BFER.

In another possible implementation, the first packet header includes a first identifier indicating that the encapsulation is IPv4 encapsulation, the first packet includes a first IPv4 header and the first BIER OAM packet, and a destination address of the first IPv4 header is a valid address that can be identified by the at least one BFER.

In another possible implementation, the first packet header includes a first identifier indicating that the encapsulation is IPv6 encapsulation, the first packet includes a first IPv6 header and a UDP encapsulated BIER OAM packet, a destination address of the first IPv6 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes a first identifier indicating that the encapsulation is IPv4 encapsulation, the first packet includes a first IPv4 header and a UDP encapsulated BIER OAM packet, a destination address of the first IPv4 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes an IPv6 encapsulated BIER header, and the IPv6 encapsulated BIER header includes a second IPv6 header and a first identifier indicating that the encapsulation is IP encapsulation.

The IPv6 encapsulated BIER header includes an outer IPv6 header and an IPv6 extension header, where the IPv6 extension header includes a BIER header.

The second IPv6 header may be the outer IPv6 header.

In another possible implementation, the first packet header includes an MPLS encapsulated BIER header, and the MPLS encapsulated BIER header includes an MPLS label and a first identifier indicating that the encapsulation is IP encapsulation.

The MPLS encapsulated BIER header may be implemented in a plurality of manners. In a possible implementation, the MPLS encapsulated BIER header includes a BIER header, where first four bytes of the BIER header are used to carry the MPLS label. In another possible implementation, the MPLS encapsulated BIER header includes the MPLS label and a BIER header.

In another possible implementation, the first packet header includes an Ethernet encapsulated BIER header, and the Ethernet encapsulated BIER header includes a first identifier indicating that the encapsulation is IP encapsulation.

In another possible implementation, the second packet includes a third IPv6 header and the second BIER OAM packet, and a source address of the third IPv6 header is a valid address that can be identified by the at least one BFER.

In another possible implementation, the second packet includes a second IPv4 header and the second BIER OAM packet, and a source address of the second IPv4 header is a valid address that can be identified by the at least one BFER.

In another possible implementation, the second packet includes a third IPv6 header and a UDP encapsulated BIER OAM packet, a source address of the third IPv6 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the second packet includes a second IPv4 header and a UDP encapsulated BIER OAM packet, a source address of the second IPv4 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the detection reply packet further includes a second packet header, and the second packet header includes a second identifier indicating that the encapsulation is IP encapsulation.

In another possible implementation, the second packet header includes an IPv6 encapsulated BIER header, and the IPv6 encapsulated BIER header includes a second IPv6 header and the second identifier.

In another possible implementation, the second packet header includes an MPLS encapsulated BIER header, and the MPLS encapsulated BIER header includes an MPLS label and the second identifier.

In another possible implementation, the second packet header includes an Ethernet encapsulated BIER header, and the Ethernet encapsulated BIER header includes the second identifier.

Advantageous effects of any one of the second aspect or the possible implementations of the second aspect correspond to advantageous effects of any one of the first aspect or the possible implementations of the first aspect. Details are not described herein again.

According to a third aspect, a bit forwarding ingress router BFIR is provided, and includes: a processing module, configured to obtain a detection request packet based on a first BIER OAM packet, where the detection request packet includes a first packet and a first packet header, the first packet is a packet obtained by encapsulating the first BIER OAM packet, the first packet header includes a bit string, and the bit string indicates at least one bit forwarding egress router BFER that is to be measured; and a sending module, configured to send the detection request packet to the at least one BFER.

In a possible implementation, the first packet header includes a first identifier indicating that the encapsulation is IPv6 encapsulation, the first packet includes a first IPv6 header and the first BIER OAM packet, and a destination address of the first IPv6 header is a valid address that can be identified by the at least one BFER.

In another possible implementation, the first packet header includes a first identifier indicating that the encapsulation is IPv4 encapsulation, the first packet includes a first IPv4 header and the first BIER OAM packet, and a destination address of the first IPv4 header is a valid address that can be identified by the at least one BFER.

In another possible implementation, the first packet header includes a first identifier indicating that the encapsulation is IPv6 encapsulation, the first packet includes a first IPv6 header and a UDP encapsulated BIER OAM packet, a destination address of the first IPv6 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes a first identifier indicating that the encapsulation is IPv4 encapsulation, the first packet includes a first IPv4 header and a UDP encapsulated BIER OAM packet, a destination address of the first IPv4 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes an IPv6 encapsulated BIER header, and the IPv6 encapsulated BIER header includes a second IPv6 header and a first identifier indicating that the encapsulation is IP encapsulation.

In another possible implementation, the first packet header includes an MPLS encapsulated BIER header, and the MPLS encapsulated BIER header includes an MPLS label and a first identifier indicating that the encapsulation is IP encapsulation.

In another possible implementation, the first packet header includes an Ethernet encapsulated BIER header, and the Ethernet encapsulated BIER header includes a first identifier indicating that the encapsulation is IP encapsulation.

In another possible implementation, the BFIR further includes: a receiving module, configured to receive a detection reply packet from the at least one BFER, where the detection reply packet includes a second packet, and the second packet is a packet obtained by encapsulating a second BIER OAM packet.

In another possible implementation, the second packet includes a third IPv6 header and the second BIER OAM packet, and a source address of the third IPv6 header is a valid address that can be identified by the at least one BFER.

In another possible implementation, the second packet includes a second IPv4 header and the second BIER OAM packet, and a source address of the second IPv4 header is a valid address that can be identified by the at least one BFER.

In another possible implementation, the second packet includes a third IPv6 header and a UDP encapsulated BIER OAM packet, a source address of the third IPv6 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the second packet includes a second IPv4 header and a UDP encapsulated BIER OAM packet, a source address of the second IPv4 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the detection reply packet further includes a second packet header, and the second packet header includes a second identifier indicating that the encapsulation is IP encapsulation.

In another possible implementation, the second packet header includes an IPv6 encapsulated BIER header, and the IPv6 encapsulated BIER header includes a second IPv6 header and the second identifier.

In another possible implementation, the second packet header includes an MPLS encapsulated BIER header, and the MPLS encapsulated BIER header includes an MPLS label and the second identifier.

In another possible implementation, the second packet header includes an Ethernet encapsulated BIER header, and the Ethernet encapsulated BIER header includes the second identifier.

According to a fourth aspect, a bit forwarding egress router BFER is provided, and includes: a receiving module, configured to receive a detection request packet from a bit forwarding ingress router BFIR, where the detection request packet includes a first packet and a first packet header, the first packet is a packet obtained by encapsulating a first BIER OAM packet, the first packet header includes a bit string, and the bit string indicates at least one BFER that is to be measured; a processing module, configured to obtain a detection reply packet based on the first packet and the bit string, where the detection reply packet includes a second packet, and the second packet is a packet obtained by encapsulating a second BIER OAM packet; and a sending module, configured to send the detection reply packet to the BFIR.

In a possible implementation, the first packet header includes a first identifier indicating that the encapsulation is IPv6 encapsulation, the first packet includes a first IPv6 header and the first BIER OAM packet, and a destination address of the first IPv6 header is a valid address that can be identified by the at least one BFER.

In another possible implementation, the first packet header includes a first identifier indicating that the encapsulation is IPv4 encapsulation, the first packet includes a first IPv4 header and the first BIER OAM packet, and a destination address of the first IPv4 header is a valid address that can be identified by the at least one BFER.

In another possible implementation, the first packet header includes a first identifier indicating that the encapsulation is IPv6 encapsulation, the first packet includes a first IPv6 header and a UDP encapsulated BIER OAM packet, a destination address of the first IPv6 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes a first identifier indicating that the encapsulation is IPv4 encapsulation, the first packet includes a first IPv4 header and a UDP encapsulated BIER OAM packet, a destination address of the first IPv4 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

In another possible implementation, the first packet header includes an IPv6 encapsulated BIER header, and the IPv6 encapsulated BIER header includes a second IPv6 header and a first identifier indicating that the encapsulation is IP encapsulation.

In another possible implementation, the first packet header includes an MPLS encapsulated BIER header, and the MPLS encapsulated BIER header includes an MPLS label and a first identifier indicating that the encapsulation is IP encapsulation.

In another possible implementation, the first packet header includes an Ethernet encapsulated BIER header, and the Ethernet encapsulated BIER header includes a first identifier indicating that the encapsulation is IP encapsulation.

In another possible implementation, the second packet includes a third IPv6 header and the second BIER OAM packet, and a source address of the third IPv6 header is a valid address that can be identified by the at least one BFER.

In another possible implementation, the second packet includes a second IPv4 header and the second BIER OAM packet, and a source address of the second IPv4 header is a valid address that can be identified by the at least one BFER.

In another possible implementation, the second packet includes a third IPv6 header and a UDP encapsulated BIER OAM packet, a source address of the third IPv6 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the second packet includes a second IPv4 header and a UDP encapsulated BIER OAM packet, a source address of the second IPv4 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

In another possible implementation, the detection reply packet further includes a second packet header, and the second packet header includes a second identifier indicating that the encapsulation is IP encapsulation.

In another possible implementation, the second packet header includes an IPv6 encapsulated BIER header, and the IPv6 encapsulated BIER header includes a second IPv6 header and the second identifier.

In another possible implementation, the second packet header includes an MPLS encapsulated BIER header, and the MPLS encapsulated BIER header includes an MPLS label and the second identifier.

In another possible implementation, the second packet header includes an Ethernet encapsulated BIER header, and the Ethernet encapsulated BIER header includes the second identifier.

According to a fifth aspect, a BFIR is provided. The BFIR has a function of implementing behavior of the BFIR in the foregoing methods. The function may be implemented based on hardware, or may be implemented based on hardware executing corresponding software. The hardware or the software includes one or more modules corresponding to the foregoing function.

In a possible design, a structure of the BFIR includes a processor and an interface. The processor is configured to support the BFIR in performing a corresponding function in the foregoing methods. The interface is configured to support the BFIR in sending a detection request packet to at least one bit forwarding egress router BFER.

The BFIR may further include a memory. The memory is configured to be coupled to the processor, and stores program instructions and data that are necessary for the BFIR.

In another possible design, the BFIR includes a processor, a transmitter, a receiver, a random-access memory (RAM), a read-only memory (ROM), and a bus. The processor is coupled to the transmitter, the receiver, the RAM, and the ROM through the bus. When the BFIR needs to be run, the BFIR is started by using a basic input/output system built into the ROM or a bootloader booting system in an embedded system, to boot the BFIR to enter a normal running state. After entering the normal running state, the BFIR runs an application program and an operating system in the RAM, so that the processor performs the method in any one of the first aspect and the possible implementations of the first aspect.

According to a sixth aspect, a BFIR is provided. The BFIR includes a main control board and an interface board, and may further include a switching board. The BFIR is configured to perform the method in any one of the first aspect or the possible implementations of the first aspect. The BFIR includes a module configured to perform the method in any one of the first aspect or the possible implementations of the first aspect.

It should be noted that there may be one or more main control boards. When there are a plurality of main control boards, the main control boards may include an active main control board and a standby main control board. There may be one or more interface boards, and the BFIR having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the BFIR may not need the switching board, and the interface board provides a function of processing service data of an entire system. In a distributed forwarding architecture, the BFIR may have at least one switching board, and exchange data between a plurality of interface boards via the switching board, to provide a large-capacity data exchange and processing capability. Therefore, a data access and processing capability of the BFIR of the distributed architecture is better than that of the device of the centralized architecture. A specific architecture that is to be used depends on a specific networking deployment scenario. This is not limited herein.

According to a seventh aspect, a BFIR is provided. The BFIR includes a control module and a first forwarding subdevice. The first forwarding subdevice includes an interface board, and may further include a switching board. The first forwarding subdevice is configured to perform a function of the interface board in the sixth aspect, and may further perform a function of the switching board in the sixth aspect. The control module includes a receiver, a processor, a transmitter, a RAM, a ROM, and a bus. The processor is coupled to the receiver, the transmitter, the RAM, and the ROM through the bus. When the control module needs to be run, the control module is started by using a basic input/output system built into the ROM or a bootloader booting system in an embedded system, to boot the control module to enter a normal running state. After entering the normal running state, the control module runs an application program and an operating system in the RAM, so that the processor performs a function of the main control board in the sixth aspect.

It may be understood that, in actual application, the BFIR may include any quantity of interfaces, processors, or memories.

According to an eighth aspect, a BFER is provided. The BFER has a function of implementing behavior of the BFER in the foregoing methods. The function may be implemented based on hardware, or may be implemented based on hardware executing corresponding software. The hardware or the software includes one or more modules corresponding to the foregoing function.

In a possible design, a structure of the BFER includes a processor and an interface. The processor is configured to support the BFER in performing a corresponding function in the foregoing methods. The interface is configured to support receiving of a detection request packet from a bit forwarding ingress router BFIR, or configured to send a detection reply packet to a BFIR.

The BFER may further include a memory. The memory is configured to be coupled to the processor, and stores program instructions and data that are necessary for the BFER.

In another possible design, the BFER includes a processor, a transmitter, a receiver, a RAM, a ROM, and a bus. The processor is coupled to the transmitter, the receiver, the RAM, and the ROM through the bus. When the BFER needs to be run, the BFER is started by using a basic input/output system built into the ROM or a bootloader booting system in an embedded system, to boot the BFER to enter a normal running state. After entering the normal running state, the BFER runs an application program and an operating system in the RAM, so that the processor performs the method in any one of the second aspect and the possible implementations of the second aspect.

According to a ninth aspect, a BFER is provided. The BFER includes a main control board and an interface board, and may further include a switching board. The BFER is configured to perform the method in any one of the second aspect or the possible implementations of the second aspect. The BFER includes a module configured to perform the method in any one of the second aspect or the possible implementations of the second aspect.

According to a tenth aspect, a BFER is provided. The BFER includes a control module and a first forwarding subdevice. The first forwarding subdevice includes an interface board, and may further include a switching board. The first forwarding subdevice is configured to perform a function of the interface board in the ninth aspect, and may further perform a function of the switching board in the ninth aspect. The control module includes a receiver, a processor, a transmitter, a RAM, a ROM, and a bus. The processor is coupled to the receiver, the transmitter, the RAM, and the ROM through the bus. When the control module needs to be run, the control module is started by using a basic input/output system built into the ROM or a bootloader booting system in an embedded system, to boot the control module to enter a normal running state. After entering the normal running state, the control module runs an application program and an operating system in the RAM, so that the processor performs a function of the main control board in the ninth aspect.

It may be understood that, in actual application, the BFER may include any quantity of interfaces, processors, or memories.

According to an eleventh aspect, a computer program product is provided. The computer program product includes computer program code. When the computer program code is run on a computer, the computer is enabled to perform the method according to any one of the first aspect or the possible implementations of the first aspect.

According to a twelfth aspect, a computer program product is provided. The computer program product includes computer program code. When the computer program code is run on a computer, the computer is enabled to perform the method according to any one of the second aspect or the possible implementations of the second aspect.

According to a thirteenth aspect, a computer-readable medium is provided. The computer-readable medium stores program code. When the computer program code is run on a computer, the computer is enabled to perform the method according to any one of the first aspect or the possible implementations of the first aspect. The computer-readable medium includes but is not limited to one or more of the following: a ROM, a programmable ROM (PROM), an erasable PROM (EPROM), a flash memory, an electrically EPROM (EEPROM), and a hard drive.

According to a fourteenth aspect, a computer-readable medium is provided. The computer-readable medium stores program code. When the computer program code is run on a computer, the computer is enabled to perform the method according to any one of the second aspect or the possible implementations of the second aspect. The computer-readable medium includes but is not limited to one or more of the following: a ROM, a PROM, an EPROM, a flash memory, an EEPROM, and a hard drive.

According to a fifteenth aspect, a chip is provided. The chip includes a processor and a data interface, and the processor reads, through the data interface, instructions stored in a memory, to perform the method in any one of the first aspect or the possible implementations of the first aspect. In a specific implementation process, the chip may be implemented in a form of a central processing unit (CPU), a micro controller unit (MCU), a micro processing unit (MPU), a digital signal processor (DSP), a system-on-a-chip (SoC), an application-specific integrated circuit (ASIC), a field-programmable gate array (FPGA), or a programmable logic device (PLD).

According to a sixteenth aspect, a chip is provided. The chip includes a processor and a data interface, and the processor reads, through the data interface, instructions stored in a memory, to perform the method in any one of the second aspect or the possible implementations of the second aspect. In a specific implementation process, the chip may be implemented in a form of a CPU, an MCU, an MPU, a DSP, a SoC, an ASIC, an FPGA, or a PLD.

According to a seventeenth aspect, a system is provided. The system includes the foregoing BFIR and BFER.

BRIEF DESCRIPTION OF DRAWINGS

FIG. 1 is a schematic networking diagram of a BIER technology according to an embodiment of this disclosure.

FIG. 2 is a schematic diagram of a possible format of a BIER header according to an embodiment of this disclosure.

FIG. 3 is a schematic diagram of another possible format of a BIER header according to an embodiment of this disclosure.

DESCRIPTION OF EMBODIMENTS

Figure 4:
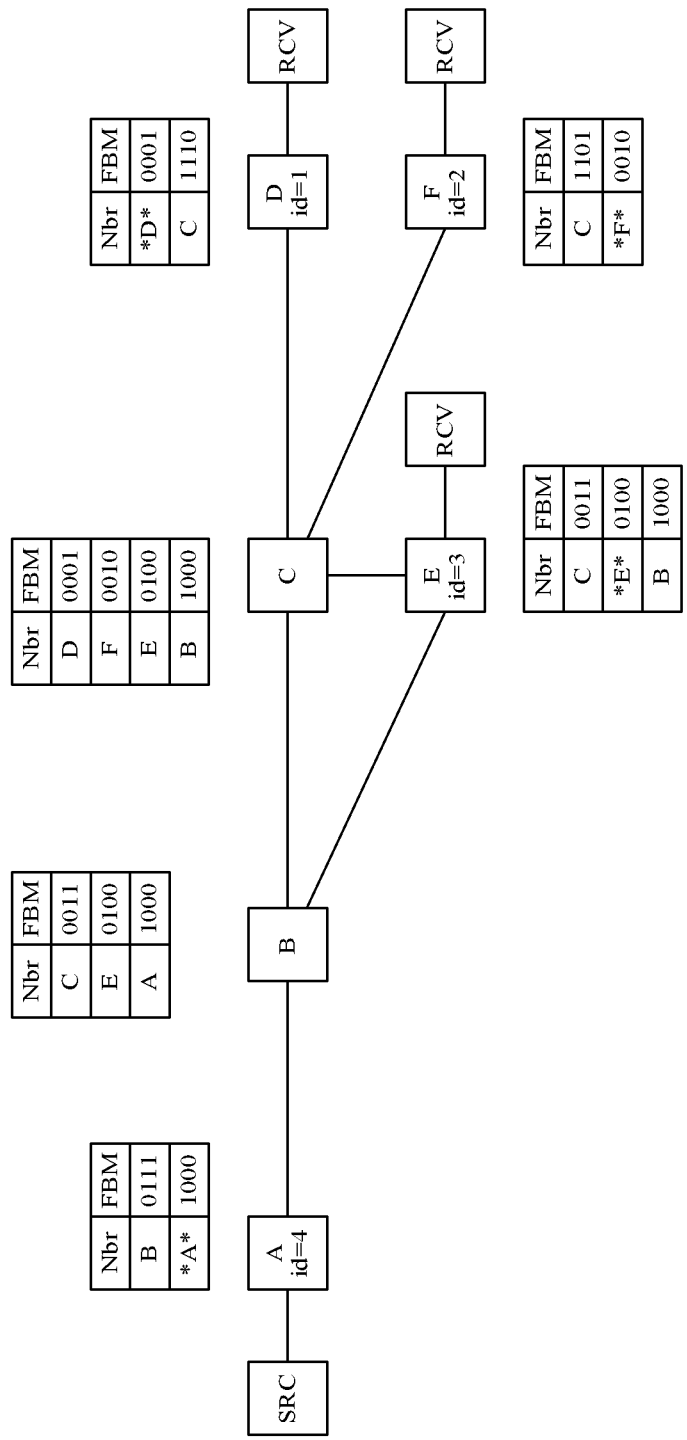
FIG. 4 shows a process of establishing a BIER forwarding table based on a BIER technology and forwarding a BIER packet based on the BIER technology.

The following describes technical solutions of this disclosure with reference to the accompanying drawings.

All aspects, embodiments, or features are presented in this disclosure based on a system that includes a plurality of devices, components, and modules. It should be appreciated and understood that, each system may include another device, component, module, and the like, and/or may not include all devices, components, modules, and the like discussed with reference to the accompanying drawings. In addition, a combination of these solutions may further be used.

In addition, in embodiments of this disclosure, terms such as "for example" and "such as" are used to represent giving an example, an illustration, or description. Any embodiment or design scheme described as an "example" in this disclosure should not be explained as being more preferred or having more advantages than another embodiment or design scheme. Exactly, the word "example" is used to present a concept in a specific manner.

In embodiments of this disclosure, "corresponding (corresponding or relevant)" and "corresponding" may be interchangeably used sometimes. It should be noted that meanings expressed by the terms are consistent when differences are not emphasized.

A network architecture and a service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that: with the evolution of the network architecture and the emergence of new service scenarios, the technical solutions provided in embodiments of this disclosure are also applicable to similar technical problems.

Reference to "an embodiment", "some embodiments", or the like described in this specification indicates that one or more embodiments of this disclosure include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "have", and their variants all mean "include but are not limited to", unless otherwise emphasized in another manner.

In this disclosure, "at least one" means one or more, and "a plurality of" means two or more. The term "and/or" describes an association relationship for describing associated objects and represents that three relationships may exist. For example, A and/or B may indicate a case in which only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items or plural items. For example, at least one item of a, b, or c may indicate: a, b, c, a and b, a and c, b and c, or a, b, and c, where a, b, and c may be singular or plural.

Multicast is a data transmission mode in which data is efficiently sent to a plurality of receivers in a Transmission Control Protocol (TCP)/IP network at a same time by using one multicast address. A multicast source sends multicast traffic to multicast group members in a multicast group through links in a network, and each multicast group member in the multicast group can receive the multicast traffic. In a multicast transmission mode, a point-to-multipoint data connection is implemented between the multicast source and the multicast group members. The multicast traffic needs to be transmitted only once on each network link, and multicast replication is performed only when there is a branch on the link. Therefore, in the multicast transmission mode, data transmission efficiency is improved and a possibility of congestion on a backbone network is reduced.

An IP multicast technology implements efficient point-to-multipoint data transmission in an IP network, so that network bandwidth can be effectively saved, and network load can be reduced. Therefore, the internet protocol multicast technology is widely used in many aspects, such as real-time data transmission, multimedia conferencing, data copy, an IP television (IPTV), games, and simulation. In the multicast technology, a multicast tree is constructed on a control plane by using a multicast protocol, and then logic on a network plane is made to be tree-shaped by using the multicast tree, to implement multicast point-to-multipoint data forwarding. Each intermediate device using construction of a distribution tree as a core needs to maintain complex multicast forwarding information status. As a network scale is increasingly large and multicast data traffic increases over time, this multicast technology faces an increasingly large challenge in terms of costs and operations and maintenance.

Therefore, a new technology for constructing a multicast data forwarding path is proposed in the industry, and is referred to as a BIER technology. In the technology, a multicast technology architecture in which a multicast distribution tree does not need to be constructed is provided.

As shown in FIG. 1, a router supporting the BIER technology is referred to as a bit forwarding router (BFR), and the BFR can receive and forward a BIER packet. A multicast forwarding domain including one or more BFRs is referred to as a BIER domain. At an ingress in the BIER domain, a BFR that performs BIER encapsulation on an original multicast data packet is referred to as a BFIR. At an egress in the BIER domain, a BFR that performs decapsulation to obtain the original multicast data packet from the BIER packet is referred to as a BFER. It should be understood that the BFIR and the BFER in the BIER domain may be referred to as edge BFRs in the BIER domain.

In the BIER domain, a globally unique bit position identifier in an entire BIER sub-domain (SD) may be configured for the edge BFR. In an example, a value is configured for each edge BFR as a BFR identifier (BFR ID). For example, the BFR ID may be a value ranging from 1 to 256. All BFR IDs in the BIER domain form a bit string.

In embodiments of this disclosure, BIER encapsulation needs to be performed when the original multicast data packet is transmitted in the BIER domain. The original multicast data packet may be encapsulated with an additional specific BIER header. The BIER header uses a bit string to identify all destination devices of the original multicast data packet. BFRs in the BIER domain may perform forwarding based on a bit index forwarding table (BIFT) and the bit string carried in the BIER header, so as to ensure that the original multicast data packet can be sent to all destination addresses.

There may be various types of BIER encapsulation. This is not limited in this disclosure. In an example, MPLS-based BIER encapsulation may be referred to as BIER-MPLS encapsulation. Ethernet-based BIER encapsulation may also be referred to as BIER-ETH encapsulation. Both BIER-MPLS encapsulation and BIER-ETH encapsulation may be applied to an IPv4 or IPv6 network. A control plane protocol in BIER runs based on IPv4 or IPv6, and data packet encapsulation and forwarding in BIER is based on BIER-MPLS encapsulation or BIER-ETH encapsulation. In another example, the BIER packet is encapsulated based on IPv6, and such encapsulation may be referred to as BIERv6 encapsulation. BIERv6 encapsulation is generally applied to an IPv6 network. A control plane protocol in BIER runs based on IPv6, and data packet encapsulation and forwarding in BIER is also based on IPv6.

In an example, a format of an MPLS encapsulated BIER packet may be: an MPLS encapsulated BIER header+the original multicast data packet. A format of a BIERv6 encapsulated BIER packet may be: an IPv6 header+an IPv6 extension header (including a BIER header)+the original multicast data packet.

It should be understood that the MPLS encapsulated BIER header may be implemented in a plurality of manners. In a possible implementation, the MPLS encapsulated BIER header includes a BIER header, where first four bytes of the BIER header represent an MPLS label. In another possible implementation, the MPLS encapsulated BIER header includes an MPLS label and a BIER header.

The BIER header whose first four bytes represent the MPLS label is also be referred to as a BIER-MPLS header.

It should also be understood that in such encapsulation, the IPv6 header and the IPv6 extension header including the BIER header together constitute a BIERv6 header. A packet formed by encapsulating an original multicast data packet with an outer BIERv6 header may also be referred to as a BIERv6 packet, in other words, the BIERv6 packet includes the outer BIERv6 header and the inner multicast data packet.

A format of the BIER header is not limited in embodiments of this disclosure, provided that the BIER header includes a bit string field. For ease of understanding, the following first describes the format of the BIER header in detail with reference to FIG. 2 and FIG. 3.

FIG. 2 is a schematic block diagram of a possible format of a BIER header. As shown in FIG. 2, a BIER header may include but is not limited to: a bit index forwarding table identifier (BIFT ID), a bit string length (BSL), and other fields. The other fields may include but are not limited to: a traffic class (TC) of an original multicast data packet after the BIER header, a stack (S), a time to live (TTL) field, an entropy field, a version (Ver) field, a nibble field, a protocol (proto) field, an OAM field, a reserved (Rsv) field, and a differentiated services code point (DSCP) field.

The fields in the BIER header are separately described below in detail.

(1) BIFT ID Field

In BIER-MPLS encapsulation, a BIFT ID is an MPLS label (L). The MPLS label may be referred to as a BIER label.

The BIFT ID field is mapped by using three fields: an SD, a BSL, and a set identifier (SI). Different BIFT IDs may correspond to different combinations of the SD, BSL, and SI.

It should be understood that different BIFT IDs may map different combinations of the SD, BSL, and SI. The BIER header format shown in FIG. 2 does not directly include the three fields SD, BSL, and SI, and the SD, BSL, and SI are three implicit fields. Values of the three fields SD, BSL, and SI need to be mapped based on the BIFT ID field. For ease of description, the following separately describes in detail the three fields SD, BSL, and SI.

1. SD

One BIER domain may be divided and configured into different sub-domains SDs based on a requirement of an actual service scenario, to support a multi-topology feature and the like of an interior gateway protocol (IGP). Each sub-domain SD may be represented by a sub-domain identifier (SD-ID). For example, a value of the SD-ID is [0-255], and a length of the SD-ID is 8 bits.

2. Bit String Length (BSL)

The BSL is a length of a bit string included in the BIER header. There may be various types of BSLs. This is not limited in embodiments of this disclosure. A smallest BSL is 64 bits, the BSL may alternatively be 128 bits, 256 bits, 512 bits, 1024 bits, or 2048 bits, and a largest BSL is 4096 bits. The BSL is identified in a packet by 4 bits. For example, when the BSL is 64 bits, the BSL is identified in a packet by 0001; when the BSL is 128 bits, the BSL is identified in the packet by 0010; when the BSL is 512 bits, the BSL is identified in the packet by 0100; when the BSL is 1024 bits, the BSL is identified in the packet by 0101; and so on.

3. SI

If a quantity of BFER devices in a network is greater than 256, to adapt to this case, BIER encapsulation includes not only a bit string, but also an SI. The SI is used to divide numbers of BIER devices into a plurality of different intervals, to support larger-scale network addressing.

The SI may be understood as a set including a plurality of edge BFRs in a network or including configured BFR IDs. In an example, the BSL is 256 bits, but there are more than 256 edge BFRs in a network, or there are more than 256 configured BFR IDs. In this case, these edge BFRs or BFR IDs need to be divided into different sets. For example, 256 edge BFRs whose BFR IDs range from 1 to 256 are a set 0 (with a set index 0, or SI=0), and 256 edge BFRs whose BFR IDs range from 257 to 512 are a set 1 (with a set index 1, or SI=1).

After receiving a BIER packet, a BFR in the BIER domain may determine, based on a BIFT ID in a BIER header, a specific SD to which the BIER packet belongs and a used BSL, and that the packet belongs to a set indicated by a specific SI and the BSL.

It should be noted that a value of the BIFT ID field corresponds to a triplet <SD, BSL, SI>. Unique <SD, BSL, SI> information can be obtained based on the BIFT-id field. The <SD, BSL, SI> information has the following functions: a length of a bit string in the BIER packet header is obtained based on the BSL, to learn of a length of the entire BIER packet header. Whether the bit string represents BFR-IDs ranging from 1 to 256 or BFR-IDs ranging from 257 to 512 can be learned based on the BSL and information about the SI. A corresponding forwarding table can be found based on the information about the SD.

(2) Bit String Field

Each bit in a bit string is used to identify an edge BFR, for example, a bit in a low bit (rightmost) in the bit string is used to identify a BFER whose BFR-ID is equal to 1. A second bit from the right to the left in the bit string identifies a BFER whose BFR-ID is equal to 2. For a forwarding entry based on which a forwarding plane performs forwarding, several specific BFERs to which a packet is to be sent are determined based on a bit string in the packet. When receiving a packet header including BIER, a BFR in a BIER domain forwards the BIER packet based on a bit string and a BIFT ID that are carried in the BIER header.

It should be noted that a value 1 of the bit indicates that the packet needs to be sent to a BFER device represented by the BFR-ID, and a value 0 of the bit indicates that the packet does not need to be sent to the BFER device represented by the BFR-ID.

For example, BIFT ID=2. After receiving the BIER packet, the BFR may obtain, based on the BIFT ID in the BIER header, that the BIER packet belongs to SD 0, a BSL used in the BIER header is 256 bits, and the BIER packet corresponds to a set 1 (a set including 256 edge BFRs whose BFR IDs range from 257 to 512).

(3) Protocol (Proto) Field

A proto field is used to identify a payload that is after a BIER packet header. In an example, a value of the proto field is a protocol number corresponding to the payload that is after the BIER packet header.

FIG. 3 is a schematic block diagram of another possible format of a BIER header. Compared with the BIER header format shown in FIG. 2, the BIER header format shown in FIG. 3 does not include a BIFT-ID field, but explicitly includes three fields SD/BSL/SI. In other words, the BIER header format shown in FIG. 3 directly includes the three fields SD/BSL/SI, and values of the SD/BSL/SI do not need to be mapped based on the BIFT ID field.

With reference to FIG. 4, a process of establishing a BIER forwarding table and forwarding a BIER packet based on a BIER technology is described in detail below by using BIER version 4 (BIERv4) encapsulation as an example.

A BIER domain shown in FIG. 4 may include a device A to a device F. The device A, the device D, the device E, and the device F are edge BFRs in the BIER domain, and the device B and the device C are BIER intermediate forwarding devices.

The device A is located at an ingress in the BIER domain, is responsible for performing BIER encapsulation on an original multicast data packet, and corresponds to the BFIR in FIG. 1. The device D, the device E, and the device F are located at an egress in the BIER domain, are responsible for obtaining the original multicast data packet by decapsulating a BIER packet, and correspond to the BFERs in FIG. 1.

In embodiments of this disclosure, a unique BFR-ID may be allocated to each edge BFR in the BIER domain. For example, in FIG. 4, BFR-IDs configured for the device A, the device D, the device E, and the device F are respectively 4, 1, 3, and 2. No BFR-ID is allocated to the intermediate forwarding BFRs, for example, the device B and the device C.

It should be noted that in embodiments of this disclosure, "ID" and "id" sometimes may be interchanged. It should be noted that when a difference is not emphasized, meanings to be expressed by the terms are the same. The BFR-ID in this disclosure may refer to an id in FIG. 4.

A bit string encapsulated in a BIER header of data traffic identifies all destination devices of the traffic. For example, a bit string corresponding to the device D whose BFR-ID is 1 is 0001, a bit string corresponding to the device F whose BFR-ID is 2 is 0010, a bit string corresponding to the device E whose BFR-ID is 3 is 0100, and a bit string corresponding to the device A whose BFR-ID is 4 is 1000.

It should be understood that a BFR-ID value allocated to each edge BFR in the BIER domain may be flooded to another BFR in the BIER domain according to a routing protocol. Flooded BIER information further includes an IP address and encapsulation information of the edge BFR. For example, flooded BIER information of the device A carries an IP address and a BIFT-id of the device A. The BFR (for example, the device F in FIG. 4) in the BIER domain may establish a BIFT entry based on the flooded BIER information, so that after receiving a BIER packet, the device F in FIG. 4 forwards the BIER packet to destination devices based on the established BIFT entry.

If the device A needs to send a BIER packet to BFERs whose BFR-IDs are respectively 1, 2, and 3, the device A needs to first send the BIER packet to a neighbor (the device B) of the device A, where an edge BFR whose BFR-ID is 4 is the device A. Therefore, a BIFT entry established by the device A is as follows:

forwarding entry 1: neighbor (Nbr)=B, and forwarding bit mask (FBM)=0111; and forwarding entry 2: Nbr*=A, and FBM=1000.

The forwarding entry 1 indicates that when any one of the first bit, the second bit, or the third bit from the right to the left of a bit string in the BIER packet is 1, the BIER packet is sent to the neighbor (the device B) of the device A, where Nbr=B indicates that the neighbor of the device A is the device B.

The forwarding entry 2 indicates that when the fourth bit from the right to the left of the bit string in the BIER packet is 1, the BIER packet is sent to the device A. In this case, the device A is the neighboring device of the device A, and therefore the device A removes the BIER header and forwards the original multicast data packet based on information in the original multicast data packet.

It should be noted that in the forwarding entry 2, * is used to identify that an Nbr of a device is the device. For example, for the device A, Nbr*=A indicates that a neighboring device of the device A is the device A. Similarly, another device in FIG. 3 may also establish a BIFT entry based on a neighboring device of the other device. For the BIFT entry established by the other device, refer to FIG. 4. Details are not described herein again.

After receiving the original multicast data packet, the device A that functions as the BFIR at the ingress in the BIER domain encapsulates the BIER header before the original multicast data packet. It should be understood that, for ease of description, the device A is referred to as an ingress device A for short below. In an example, after receiving the original multicast data packet, the ingress device A may learn of a destination device of the original multicast data packet based on a BFR-ID flooded in a border gateway protocol BGP message. For example, receivers of the original multicast data packet are the destination device E whose BFR-ID is 3, the destination device F whose BFR-ID is 2, and the destination device D whose BFR-ID is 1. The ingress device A encapsulates the bit string in the BIER header as 0111, and forwards an encapsulated BIER packet to the neighboring device B based on the forwarding entry 1. After receiving the BIER packet, the device B determines, based on the bit string 0111 and BIFT entries, that the BIER packet needs to be sent to the device C and the device E. When sending the BIER packet to the device C, the device B may perform an AND operation on the bit string (0111) in the BIER header and an FBM field corresponding to Nbr-C in the BIFT entry. In this embodiment of this disclosure, a result of the AND operation is 0011. Therefore, the device B may modify the bit string in the BIER header to 0011 and send the BIER packet to the device C. Similarly, when sending the BIER packet to the device E, the device B may modify the bit string in the BIER header to 0100. After receiving the BIER packet, the device E determines, based on the bit string 0100, that the BIER packet is to be sent to the neighboring device E. Because the device E determines, based on an identifier * in the forwarding table, that the neighboring device E is the device E, the device E that functions as the BFER at the egress in the BIER domain may decapsulate the original multicast data packet from the BIER packet, and forward the original multicast data packet based on the information in the inner original multicast data packet.

Figure 5:
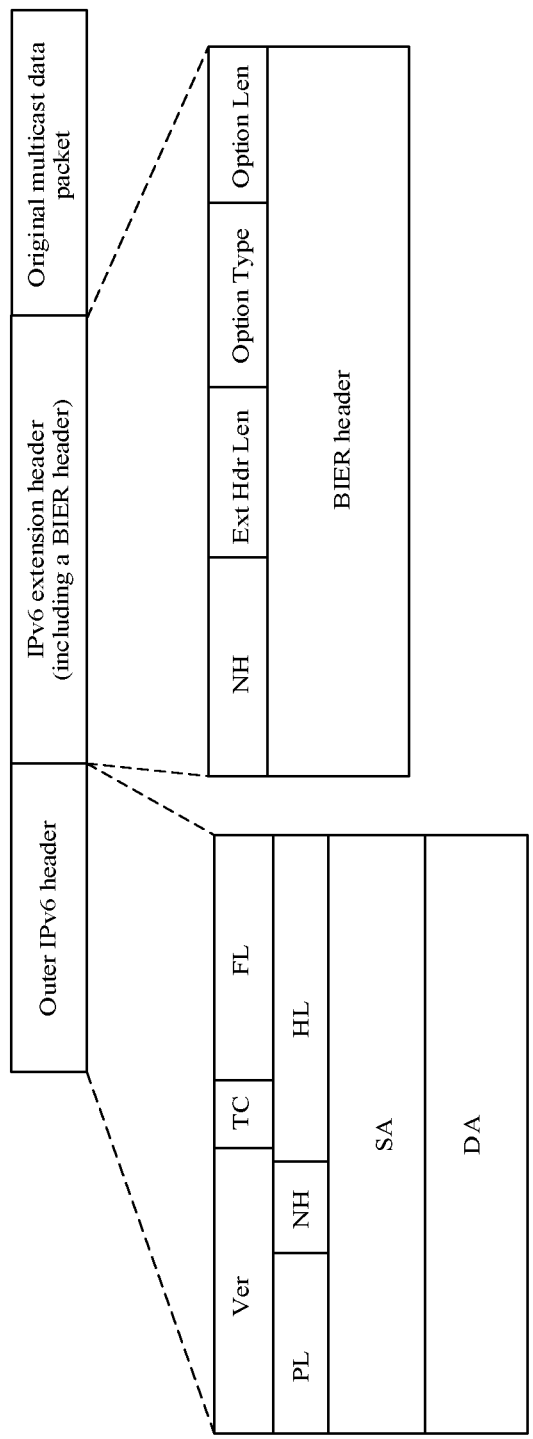
FIG. 5 is a schematic diagram of a possible format of a BIER version 6 (BIERv6) encapsulated packet according to an embodiment of this disclosure.

With reference to FIG. 5, the following describes in detail a BIERv6 encapsulation format and a BIER packet forwarding process by using BIERv6 encapsulation as an example.

FIG. 5 is a schematic block diagram of possible BIERv6 encapsulation. Refer to FIG. 5. In such encapsulation, an IPv6 header and an IPv6 extension header including a BIER header together constitute a BIERv6 header. A packet formed by encapsulating an original multicast data packet with an outer BIERv6 header may also be referred to as a BIERv6 packet, in other words, the BIERv6 packet includes the outer BIERv6 header and the inner multicast data packet.

The IPv6 extension header including the BIER header is not limited in embodiments of this disclosure. For example, the IPv6 extension header may be a destination options header (DOH).

Fields included in the outer IPv6 header are described below in detail.

Ver field: The Ver field is an IP version number, and a value 6 of the version field represents IPv6.

TC field: The TC field identifies a priority of a packet.

Flow label (FL) field: A same FL may be used to label a plurality of packets belonging to same traffic, and another FL value is used to label a plurality of packets belonging to different traffic.

Payload length (PL) field: The PL field indicates a length of a packet.

Next header (NH) field: The NH field indicates a type of an NH of a packet, for example, may represent an IPv6 extension header. The NH field may also be represented as a NextHdr field.

Hop limit (HL) field: The HL field indicates a limit on a quantity of packets. When a value in the HL field is less than a preset threshold, a device that receives a BIER packet may not forward the packet, but send the packet to a control plane for processing.

Source address (SA) field: The SA field identifies an SA of a packet.

Destination address (DA) field: The DA field identifies a DA of a packet.

The DA field is continuously updated to an IP address of a next hop. The BIER domain shown in FIG. 3 is used as an example. The device A is used as a head node (an ingress device) in an IPv6 network. After receiving the original multicast data packet, the device A encapsulates the packet after the BIERv6 header, to be specific, after the outer IPv6 header and the IPv6 extension header including the BIER header, to obtain the encapsulated BIERv6 packet.

The BIER packet header included in the IPv6 extension header carries a bit string representing a set of destination devices. The device A sends the encapsulated BIERv6 packet to the device B based on the BIER packet header and information about the bit string of the BIER packet header. During sending, the destination address field in the IPv6 header may be a unicast address (for example, B:: 100) of the device B. The device B sends the packet to the device C and the device E based on the BIER packet header and the information about the bit string of the BIER packet header. During sending, the destination address field in the IPv6 header may be a unicast address (for example, C:: 100) of the device C and a unicast address (for example, E:: 100) of the device E. Similarly, the device C sends the packet to the device D and the device F based on the BIER packet header and the information about the bit string of the BIER packet header. During sending, the destination address field in the IPv6 header may be a unicast address (for example, D:: 100) of the device D and a unicast address (for example, F:: 100) of the device F.

OAM detection: Based on actual requirements of an operator on network operations, network management work is classified into three types: operations, administration, and maintenance. The operations mainly complete daily work performed on a network and a service, such as analysis, prediction, planning, and configuration, and the maintenance is mainly a daily operation activity such as testing and fault management performed on the network and the service.

An existing BIER OAM solution is implemented as follows: A BIER header is followed by a BIER OAM request packet that is not additionally encapsulated, and a Proto field of the BIER header indicates that the BIER header is followed by the BIER OAM request packet that is not additionally encapsulated. A BFIR is responsible for encapsulating the BIER OAM packet after the BIER header in this manner and sends an encapsulated packet, where the packet is forwarded based on the BIER header. After the packet reaches a BFER node, the BFER node identifies the BIER OAM packet that is not encapsulated based on the Proto field in the BIER header, and returns a BIER OAM reply packet to the BFIR. In this way, BIER OAM detection is implemented.

However, in the foregoing technical solution, the BIER OAM packet that is not encapsulated is not applicable to some BIER encapsulation scenarios. The following lists several possible scenarios.

A BIERv6 encapsulation scenario is used as an example. In BIERv6 encapsulation, a value of an IPv6 NH field indicates a format of a packet that is after a BIERv6 header. If the foregoing technical solution is used, an NH value needs to be allocated to a BIER OAM packet that is not encapsulated or an original BIER OAM packet. However, a quantity of available NH values is small, and obtaining costs are high.

A BIER-MPLS encapsulation scenario is used as an example. Based on BIER-MPLS encapsulation, a BIER header may "pop up". If the manner in the foregoing technical solution is used, after the BIER header "pops up", it cannot be determined that a BIER OAM packet is identified, and consequently BIER OAM detection cannot be implemented.

Therefore, how to implement BIER OAM detection in a BIER network becomes an urgent problem to be resolved.

In view of this, embodiments of this disclosure provide a BIER OAM detection method. A BIER OAM packet that is not encapsulated or an original BIER OAM packet is encapsulated, so that the method is applicable to more BIER encapsulation scenarios, and BIER OAM detection is implemented in a BIER network.

Figure 6:
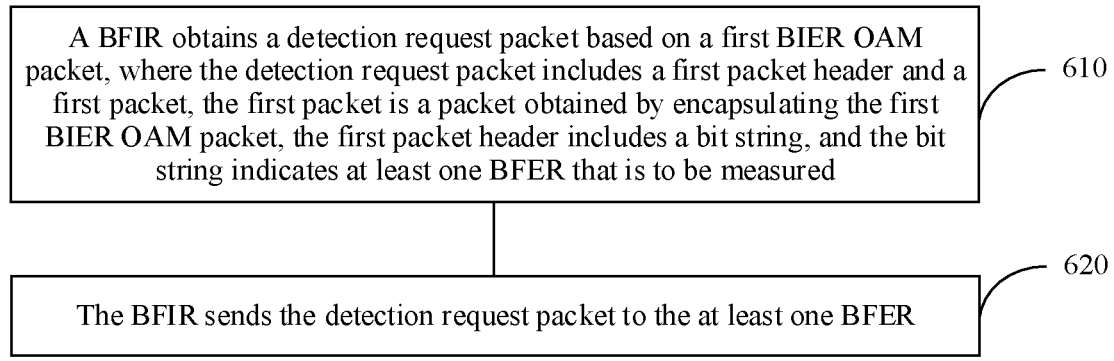
FIG. 6 is a schematic flowchart of a BIER OAM detection method according to an embodiment of this disclosure.

The following describes in detail a BIER OAM detection method provided in an embodiment of this disclosure with reference to FIG. 6.

FIG. 6 is a schematic flowchart of a BIER OAM detection method according to an embodiment of this disclosure. Refer to FIG. 6. The method may include steps 610 and 620. The following separately describes steps 610 and 620 in detail.

Step 610: A BFIR obtains a detection request packet based on a first BIER OAM packet, where the detection request packet includes a first packet header and a first packet, the first packet is a packet obtained by encapsulating the first BIER OAM packet, the first packet header includes a bit string, and the bit string indicates at least one bit forwarding egress router BFER that is to be measured.

It should be understood that the first BIER OAM packet may be a BIER OAM packet that is not encapsulated or an original BIER OAM packet. The first BIER OAM packet may also be referred to as an original BIER OAM packet.

The detection request packet may be used for detection and check on connectivity of a BIER tunnel. The first BIER OAM packet included in the detection request packet may be used for detection and check on the connectivity of the BIER tunnel. In an example, the first BIER OAM packet includes a req/rep field, where the request field indicates a type of a request message, and a value 1 of the request field indicates that an encapsulated BIER packet is a BIER OAM packet of an Echo Request type. The reply field indicates a type of a reply message.

In this embodiment of this disclosure, that a BFIR obtains a detection request packet based on a first BIER OAM packet may be understood as follows. The BFIR encapsulates the first BIER OAM packet to obtain the detection request packet. In an example, the detection request packet obtained through encapsulation may include the first packet header and the first packet.

The following describes in detail a format of the first packet.

There are a plurality of formats of the first packet obtained by encapsulating the first BIER OAM packet. In a possible implementation, UDP encapsulation may be performed on the first BIER OAM packet to obtain the first packet. In another possible implementation, IP encapsulation may alternatively be performed on the first BIER OAM packet to obtain the first packet.

It should be understood that the UDP encapsulation may be encapsulating a UDP header at an outer layer of the first BIER OAM packet.

It should be further understood that the IP encapsulation may be encapsulating an IP header at an outer layer of the first BIER OAM packet, or may be encapsulating an IP header and a UDP header at an outer layer of the first BIER OAM packet.

The following describes in detail a format of the detection request packet by using an example in which the IP encapsulation is encapsulation of the IP header at the outer layer of the first BIER OAM packet.

For example, the first packet header includes a first identifier indicating that the encapsulation is IPv6 encapsulation, and the first packet includes a first IPv6 header and the first BIER OAM packet.

A destination address of the first IPv6 header is a valid address that can be identified by the at least one BFER. A valid IPv6 address that can be identified by the at least one BFER may be any address in a range of 0:0:0:0:0:FFFF: 7F00:0/104.

For another example, the first packet header includes a first identifier indicating that the encapsulation is IPv4 encapsulation, and the first packet includes a first IPv4 header and the first BIER OAM packet.

A destination address of the first IPv4 header is a valid address that can be identified by the at least one BFER. A valid IPv4 address that can be identified by the at least one BFER may be any address in a range of 127.0.0.0/8.

The following describes in detail a format of the detection request packet by using an example in which the IP encapsulation is encapsulation of the IP header and the UDP header at the outer layer of the first BIER OAM packet.

For example, the first packet header includes a first identifier indicating that the encapsulation is IPv6 encapsulation, and the first packet includes a first IPv6 header, a UDP header, and the first BIER OAM packet.

A destination address of the first IPv6 header is a valid address that can be identified by the at least one BFER, and a destination port included in the UDP header indicates a listening port of the BFER that receives the detection request packet.

It should be understood that the BFER that receives the detection request packet may determine, based on the destination address that is of the first IPv6 header in the first packet and that is a valid address that can be identified by the at least one BFER and the listening port for receiving the detection request packet, that a BIER OAM packet is encapsulated in the detection request packet. In this way, the BFER may feed back a detection reply packet to the BFIR based on the BIER OAM packet.

For another example, the first packet header includes a first identifier indicating that the encapsulation is IPv4 encapsulation, and the first packet includes a first IPv4 header, a UDP header, and the first BIER OAM packet.

A destination address of the first IPv4 header is a valid address that can be identified by the at least one BFER, and a destination port included in the UDP header indicates a listening port of the BFER that receives the detection request packet.

It should be understood that the BFER that receives the detection request packet may determine, based on the destination address that is of the first IPv4 header in the first packet and that is a valid address that can be identified by the at least one BFER and the listening port for receiving the detection request packet, that a BIER OAM packet is encapsulated in the detection request packet.

The following describes in detail a format of the first packet header.

There are many implementations of the first packet header in embodiments of this disclosure. This is not limited in this disclosure. BIERv6 encapsulation is used as an example. The first packet header may include an IPv6 encapsulated BIER header (which may also be referred to as a BIERv6 header, and includes an outer IPv6 header and an IPv6 extension header). BIER-MPLS encapsulation is used as an example. The first packet header may include an MPLS encapsulated BIER header. Ethernet encapsulation is used as an example. The first packet header may include an Ethernet encapsulated BIER header. For a specific format of the MPLS encapsulated BIER header, refer to the foregoing descriptions. Details are not described herein again.

Step 620: The BFIR sends the detection request packet to the at least one BFER.

After receiving the detection request packet sent by the BFIR, the at least one BFER may determine that the detection request packet carries the first BIER OAM packet, and determine, based on an identifier carried in the req field in the first BIER OAM packet, that the first BIER OAM packet carried in the detection request packet is an OAM request packet.

The at least one BFER compares information about the bit string in the BIER OAM header with BFR-id information configured on the at least one BFER to determine whether detection subjects of the OAM request packet include the at least one BFER. If a bit, in the bit string, corresponding to a BFR-id of the BFER is 1, the BFER obtains a second BIER OAM packet, encapsulates the second BIER OAM packet to obtain the detection reply packet, and sends the detection reply packet to the BFIR.

In an example, the second BIER OAM packet may indicate, based on an identifier carried in the rep field, that the second BIER OAM packet is an OAM reply packet.

An encapsulation format of the detection reply packet is related to a manner in which the BFER feeds back the detection reply packet. The following describes several possible implementations in detail.

In a possible implementation, the BFER feeds back the detection reply packet through routing. In this implementation, the detection reply packet includes a second packet. There are a plurality of formats of the second packet. For example, UDP encapsulation may be performed on the second BIER OAM packet to obtain the foregoing second packet. For another example, IP encapsulation may alternatively be performed on the second BIER OAM packet to obtain the second packet. For specific UDP encapsulation and IP encapsulation, refer to the foregoing descriptions of the first packet. Details are not described herein again.

In another possible implementation, the BFER feeds back the detection reply packet through BIER. In this implementation, the detection reply packet includes a second packet and a second packet header. BIERv6 encapsulation is used as an example. The second packet header may include an IPv6 encapsulated BIER header (which may also be referred to as a BIERv6 header, and includes an outer IPv6 header and an IPv6 extension header). MPLS encapsulation is used as an example. The second packet header may include an MPLS encapsulated BIER header. Ethernet encapsulation is used as an example. The second packet header may include an Ethernet encapsulated BIER header.

In the foregoing technical solution, in a BIERv6 encapsulation scenario, IP encapsulation is performed on the original BIER OAM packet, so that a value of an IPv6 NH field in the BIERv6 header indicates that a packet after the BIERv6 header is an IP packet. In this way, it is unnecessary to allocate an NH value to the BIER OAM packet that is not encapsulated or the original BIER OAM packet, and costs are low. In the BIER-MPLS encapsulation scenario, IP encapsulation is performed on the original BIER OAM packet. Even if the BIER header "pops up", a BIER OAM packet after the BIER header can also be identified.

The following uses the BIERv6 encapsulation as an example to describe in detail a specific implementation process of the BIER OAM detection method provided in this embodiment of this disclosure with reference to the scenario of the BIER domain shown in FIG. 4.

It should be understood that the following examples are merely intended to help a person skilled in the art understand embodiments of this disclosure, instead of limiting embodiments of this disclosure to a specific numerical value or a specific scenario shown in the examples. Clearly, a person skilled in the art may make various equivalent modifications or changes based on the following examples provided below, and such modifications and changes also fall within the scope of embodiments of this disclosure.

Figure 7:
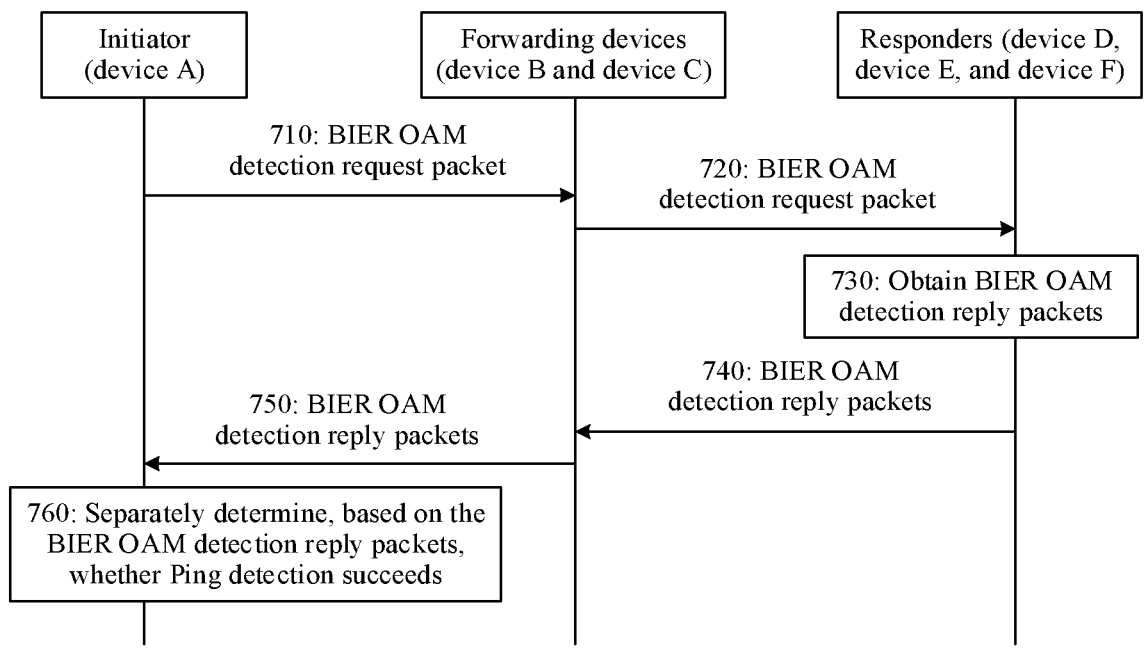
FIG. 7 is a schematic flowchart of Ping detection according to an embodiment of this disclosure.

FIG. 7 is a schematic flowchart of Ping detection according to an embodiment of this disclosure. The method shown in FIG. 7 may include steps 710 to 760. The following separately describes steps 710 to 760 in detail.

It should be understood that Ping detection is used to detect whether an initiator device and a responder device are connected, and may also be referred to as connectivity detection.

Step 710: An initiator (a device A) obtains and sends a BIER OAM detection request packet.

It should be understood that the BIER OAM detection request packet may correspond to the detection request packet described above.

As shown in FIG. 4, the device A functions as an initiator, and is configured to send the BIER OAM detection request packet. The device B and the device C function as forwarding devices to transmit the BIER OAM detection request packet. The device D, the device E, and the device F function as responders, and are configured to: receive the BIER OAM detection request packet sent by the device A, and send BIER OAM detection reply packets to the device A.

Figure 8:
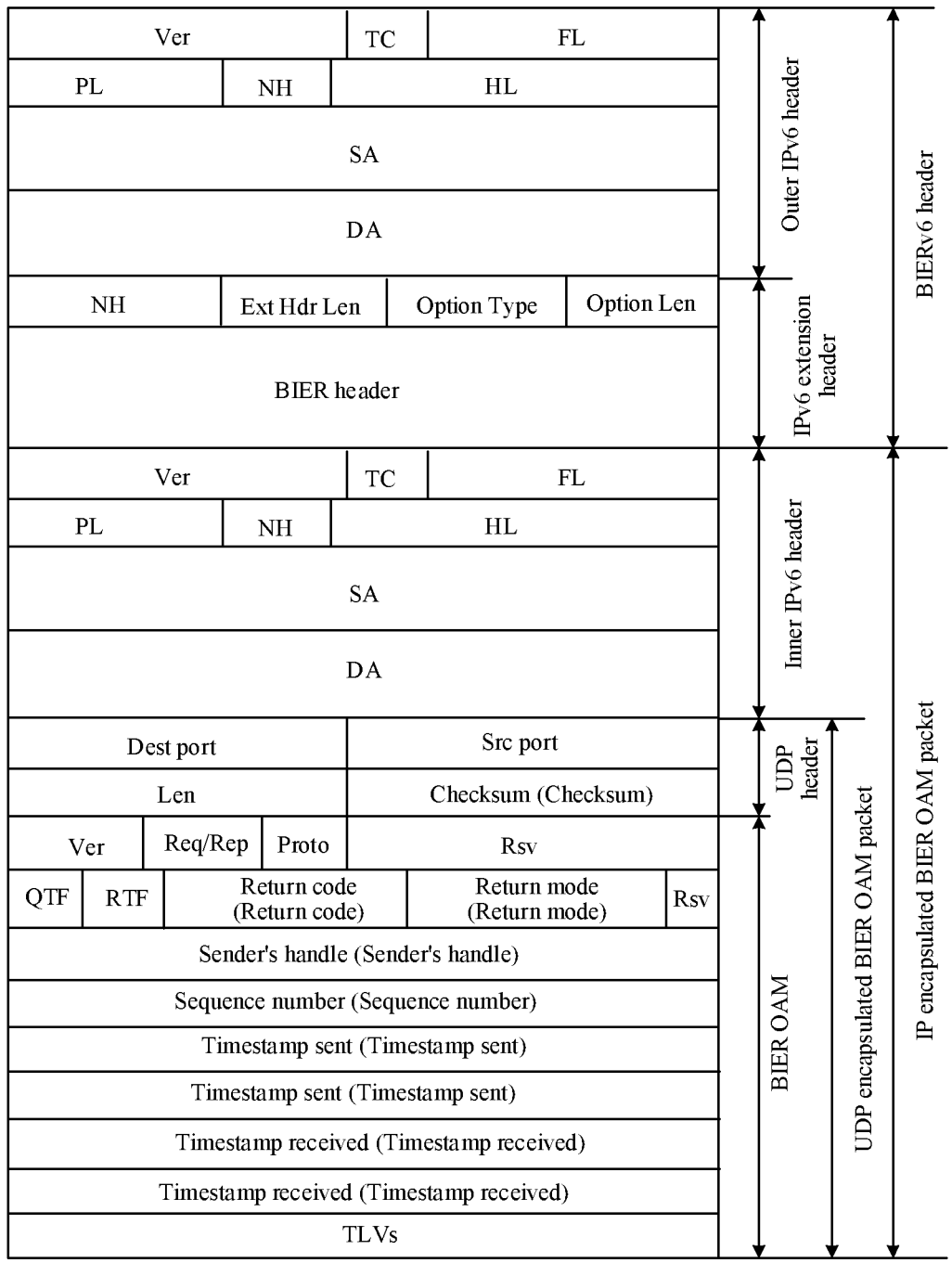
FIG. 8 is a schematic diagram of a format of a BIER OAM detection request packet according to an embodiment of this disclosure.

In a possible implementation, BIERv6 encapsulation is used as an example, and a format of the BIER OAM detection request packet is shown in FIG. 8. Refer to FIG. 8. The BIER OAM detection request packet may include: an IPv6 encapsulated BIER header+an IPv6 header+a UDP header+a BIER OAM packet.

It should be understood that the IPv6 encapsulated BIER header may also be referred to as a BIERv6 header, and includes an outer IPv6 header and an IPv6 extension header. The IPv6 extension header includes a BIER header. The IPv6 header after the IPv6 encapsulated BIER header may be referred to as an inner IPv6 header.

It should be further understood that a UDP header+a BIER OAM packet may be referred to as a UDP encapsulated BIER OAM packet. An IPv6 header+a UDP header+a BIER OAM packet may be referred to as an IP encapsulated BIER OAM packet.

It should be noted that the UDP header includes a checksum field, and the field is used to check a BIER packet, so as to prevent an attacker from attacking the BIER packet. The checksum field in the UDP header is determined based on a source address SA and a destination address DA in the outer IPv6 header. In BIERv6 encapsulation, the DA field is continuously updated to an IP address of a next hop. Consequently, a fixed checksum value cannot be determined based on the source address SA and the destination address DA in the outer IPv6 header.

Therefore, the BIER OAM detection request packet in embodiments of this disclosure may include two IPv6 headers. One is the outer IPv6 header. The destination address DA in the outer IPv6 header is continuously updated to the IP address of the next hop for BIER forwarding. The other is the inner IPv6 header. A destination address DA in the inner IPv6 header is a valid address that can be identified by at least one BFER.

The following separately describes the foregoing parts in detail.

(1) Outer IPv6 Header

A local address of the device A is encapsulated in the source address SA field. The IP address, of the next hop, to be sent to the responder is encapsulated in the destination address DA field. A protocol number of the IPv6 extension header is encapsulated in an NH field. For example, a value of the NH field is 60.

It should be understood that the DA field is continuously updated to the IP address of the next hop in a BIER forwarding process. In an example, a forwarding plane of a device may replicate a packet and query a BIER neighbor table based on information such as a bit string, an SI, and a sub-domain ID in a BIER header, to obtain an EndBier IP of a next hop. The EndBier IP may be used as an IP address of the next hop, and indicates an IP address of a device that can parse the BIER packet. For a specific IP address encapsulated in the destination address DA field, refer to the foregoing descriptions in FIG. 4. Details are not described herein again.

It should be noted that Ping detection is used to detect whether the initiator device and the responder device are connected. Therefore, the BIER OAM detection request packet needs to be transmitted from the initiator to the responder. If a value of an HL field in the outer IPv6 header is small, time excess may occur on the forwarding device. In this case, the forwarding device does not transmit the BIER OAM detection request packet to the responder. Therefore, in this embodiment of this disclosure, during Ping detection, the value of the HL field may be set to a large value, so that time excess does not occur during packet forwarding. In an example, the value of the HL field is 255.

(2) IPv6 Extension Header (Including the BIER Header)

Values of an NH field identify different types of user multicast packets after the IPv6 extension header. For example, if the value of the NH field is 4, it may indicate that the packet after the IPv6 extension header is an IPv4 packet. For another example, if the value of the NH field is 41, it may indicate that the packet after the IPv6 extension header is an IPv6 packet. For another example, if the value of the NH field is 143, it may indicate that the packet after the IPv6 extension header is an Ethernet packet.

(3) Inner IPv6 Header

A local address of the device A is encapsulated in a source address SA field. A valid IPv6 address that can be identified by the at least one BFER is encapsulated in the destination address DA field. The IPv6 address may indicate a device that receives the packet not to forward the packet. The device may determine, by searching a routing table, that the packet needs to be sent to a control plane of the device, the control plane encapsulates a reply packet, and the device sends the reply packet to the initiator (the device A).

In an example, the IPv6 address encapsulated in the destination address DA field may be selected from an IPv6 loopback address range 0:0:0:0:0:FFFF: 7F00:0/104.

(4) UDP Header and BIER OAM Packet

The UDP header includes: a destination port field, a source port field, a length (Len) field, and a checksum field.

A port number used by a local device to send the BIER OAM detection request packet is encapsulated in the source port field, and the port number may be randomly generated. A UDP listening port number of a receiving end is encapsulated in the destination port field. A value in the checksum field is determined based on values of a source address SA field and a destination address DA field in an inner IPv6 header.

It should be understood that the value in the checksum field is used by the responder to check the received BIER OAM detection request packet, so as to determine that the received BIER OAM detection request packet is sent by the initiator (the device A) and is not attacked or tampered with. The responder may determine a checksum value based on the value of the source address SA field and the value of the destination address DA field in the inner IPv6 header of the received BIER OAM detection request packet, and compare the checksum value with the value in the checksum field. If the determined checksum value is the same as the value in the checksum field, this may be understood as that the packet is not attacked or tampered with.

The BIER OAM packet includes: a req/rep field, a protocol (proto) field, a return code field, a return mode field, a sender's handle field, a sequence number field, and an OAM data area.

The request field indicates a type of a request message, and a value 1 of the request field indicates that an encapsulated BIER packet is a BIER OAM packet of an Echo Request type. The reply field indicates a type of a reply message. A value of the proto field is 0.

The return mode field indicates a manner of returning the BIER OAM detection reply packet. In an example, if a value of the return mode field is 2, it indicates that the responder returns the BIER OAM detection reply packet through routing; and if a value of the return mode field is 3 or 4, it indicates that the responder returns the BIER OAM detection reply packet through BIER. Formats of reply packets returned in different modes are different. For details about the packet format, refer to the following descriptions. Details are not described herein.

The return code field indicates a detection result fed back by the responder.

The sender's handle field indicates an identifier of the initiator (the device A), and the identifier is used by the initiator (the device A) to check the BIER OAM detection reply packet after the initiator receives the returned BIER OAM detection reply packet. For a specific check manner, refer to the following descriptions. Details are not described herein.

An initial value of the sequence number field is 0, and a value of the sequence number field is increased by 1 each time a request packet is sent. The sequence number field is used by the initiator (the device A) to check the BIER OAM detection reply packet after the initiator receives the returned BIER OAM detection reply packet. For a specific check manner, refer to the following descriptions. Details are not described herein.

A type/length/value (TLV) may be encapsulated in the OAM data area, and the TLV may include information about the initiator. The information about the initiator may include a bit string, a BSL, an SI, and a sub-domain ID. In an example, the TLV may be an Original SI-BitString TLV.

Step 720: The forwarding devices (the device B and the device C) receive the BIER OAM detection request packet sent by the initiator (the device A), and forward the BIER OAM detection request packet to the responders (the device D, the device E, and the device F).

After receiving the BIER OAM detection request packet, the forwarding devices (the device B and the device C) may send the BIER OAM detection request packet to the responders (the device D, the device E, and the device F) based on information about the bit string in the BIER OAM detection request packet. For a specific implementation process of BIERv6 forwarding, refer to the descriptions in FIG. 5. Details are not described herein again.

Step 730: The responders (the device D, the device E, and the device F) receive the BIER OAM detection request packet, and obtain the BIER OAM detection reply packets.

The BIER OAM detection reply packet may correspond to the detection reply packet described above.

In a possible implementation, after receiving the BIER OAM detection request packet, the responders (the device D, the device E, and the device F) may send the BIER OAM detection request packet to control planes of the devices, and the control planes obtain the BIER OAM detection reply packets.

In some embodiments, before receiving the BIER OAM detection request packet, the responders (the device D, the device E, and the device F) each need to enable a UDP listening port, and each receive the BIER OAM detection request packet through the UDP listening port.

For ease of description, the following uses an example in which the device F constructs the BIER OAM detection reply packet on the control plane for description.

After receiving the BIER OAM detection request packet, the device F may identify, on a forwarding plane, whether the bit string in the BIER OAM detection request packet hits the device F. If the bit string hits the device F, the device F determines, based on the destination address in the inner IPv6 header, to send the BIER OAM detection request packet to the control plane for processing, and does not perform BIER forwarding.

The BIER OAM detection reply packet may be encapsulated on the control plane. The control plane may determine, based on the return mode field in the BIER OAM detection request packet, a mode of returning the BIER OAM detection reply packet. Formats of BIER OAM detection reply packets returned in different modes are different. The following describes in detail the format of the BIER OAM detection reply packet.

In a possible implementation, the control plane determines, based on the value 3 or 4 of the return mode field, that the responder returns the BIER OAM detection reply packet through BIER. In this implementation, the format of the BIER OAM detection reply packet is: an IPv6 encapsulated BIER header+an IPv6 header+a UDP header+a BIER OAM packet.

In the outer IPv6 header, a local address of the device F is encapsulated in a source address SA field, and the IP address, of the next hop, sent to the initiator (the device A) is encapsulated in a destination address DA field.

In the inner IPv6 header, the local address of the device F is encapsulated in a source address SA field, and the address in the source address SA field in the inner IPv6 header of the BIER OAM detection request packet is encapsulated in a destination address DA field.

In the UDP header, a local UDP listening port number is encapsulated in a source port field, and the port number encapsulated in the source port field of the BIER OAM detection request packet is encapsulated in a destination port field.

In BIER OAM packet, a reply field indicates a type of a reply message. For example, the encapsulated BIER packet is a BIER OAM packet of an Echo Reply type. A value of a handle field is the same as that of the handle field of the BIER OAM detection request packet. The value of a sequence number field is the same as that of the sequence number field in the BIER OAM detection request packet. A return code field indicates a detection result fed back by the responder.

The device F may check the received BIER OAM detection request packet, and encapsulate a check result in the return code field.

In an example, the device F may calculate a checksum value based on the inner IPv6 header and the UDP header in the received BIER OAM detection request packet, and compare the checksum value with the value of the checksum field in the BIER OAM detection request packet. If the values are the same, this may be understood as that the packet is not attacked or tampered with.

In another example, the device F may further check whether a device corresponding to the bit string in the BIER OAM detection request packet includes the node F. For example, if the device corresponding to the bit string includes only the node F, a value of the return code field may be set to 3. For another example, if the node F is only a target BFR of devices corresponding to the bit string, a value of the return code field may be set to 4.

In another possible implementation, the control plane determines, based on the value 2 of the return mode field, that the responder returns the BIER OAM detection reply packet through IPv6 routing. In this implementation, the format of the BIER OAM detection reply packet is: an IPv6 header+a UDP header+BIER OAM packet.

In the IPv6 header, a local address of the device F is encapsulated in a source address SA field, and an IP address of the initiator (the device A) is encapsulated in a destination address DA field. The IP address of the initiator (the device A) may be obtained from a source IP address in the inner IPv6 header of the BIER OAM detection request packet, and the source IP address is used as the destination IP address of the BIER OAM detection reply packet. For encapsulation of other fields, refer to the foregoing descriptions. Details are not described herein again.

Step 740: The responders (the device D, the device E, and the device F) send BIER OAM detection reply packets to the forwarding devices (the device B and the device C).

Step 750: The forwarding devices (the device B and the device C) send the BIER OAM detection reply packets to the initiator (the device A).

Step 760: The initiator (the device A) separately determines, based on the BIER OAM detection reply packets, whether Ping detection succeeds.

After receiving the BIER OAM detection reply packet, the initiator (the device A) may identify whether the BIER OAM detection reply packet is a valid packet. In other words, the initiator (the device A) needs to determine whether the received BIER OAM detection reply packet is a reply packet corresponding to the sent BIER OAM detection request packet.

In an implementation, the initiator (the device A) may check whether a port number encapsulated in the destination port field in the BIER OAM detection reply packet is consistent with the port number encapsulated in the source port field in the BIER OAM detection request packet. If the port numbers are inconsistent, this may be understood as that the BIER OAM detection reply packet is an invalid packet.

In another implementation, the initiator (the device A) may further check whether the value of the handle field in the BIER OAM detection reply packet is the same as the value of the handle field in the BIER OAM detection request packet. If the values are the same, this may be understood as that the BIER OAM detection reply packet is a valid packet.

In another implementation, the initiator (the device A) may further check whether the value of the sequence number field in the BIER OAM detection reply packet is the same as the value of the sequence number field in the BIER OAM detection request packet. If the values are the same, this may be understood as that the BIER OAM detection reply packet is a valid packet.

It should be noted that, after sending the BIER OAM detection request packet, the initiator (the device A) records the source port number, the value of the handle field, the value of the sequence number field, and the like in the sent BIER OAM detection request packet, so as to perform check after receiving the BIER OAM detection reply packet.

After determining that the BIER OAM detection reply packet is a valid packet, the initiator (the device A) may determine, based on the BIER OAM detection reply packet, whether Ping detection succeeds. In an example, connectivity detection between the initiator device and the responder device may be implemented based on the return code field in the BIER OAM detection reply packet.

If the value of the return code field in the BIER OAM detection reply packet is 3 or 4, it may be determined that the initiator (the device A) and the responder are connected.

Optionally, in some embodiments, the initiator (the device A) may further determine, based on the return code field of the BIER OAM detection reply packet, a result of checking the received BIER OAM detection request packet by the responder. The check result may be, for example, whether the packet is attacked or tampered with.

Figure 9:
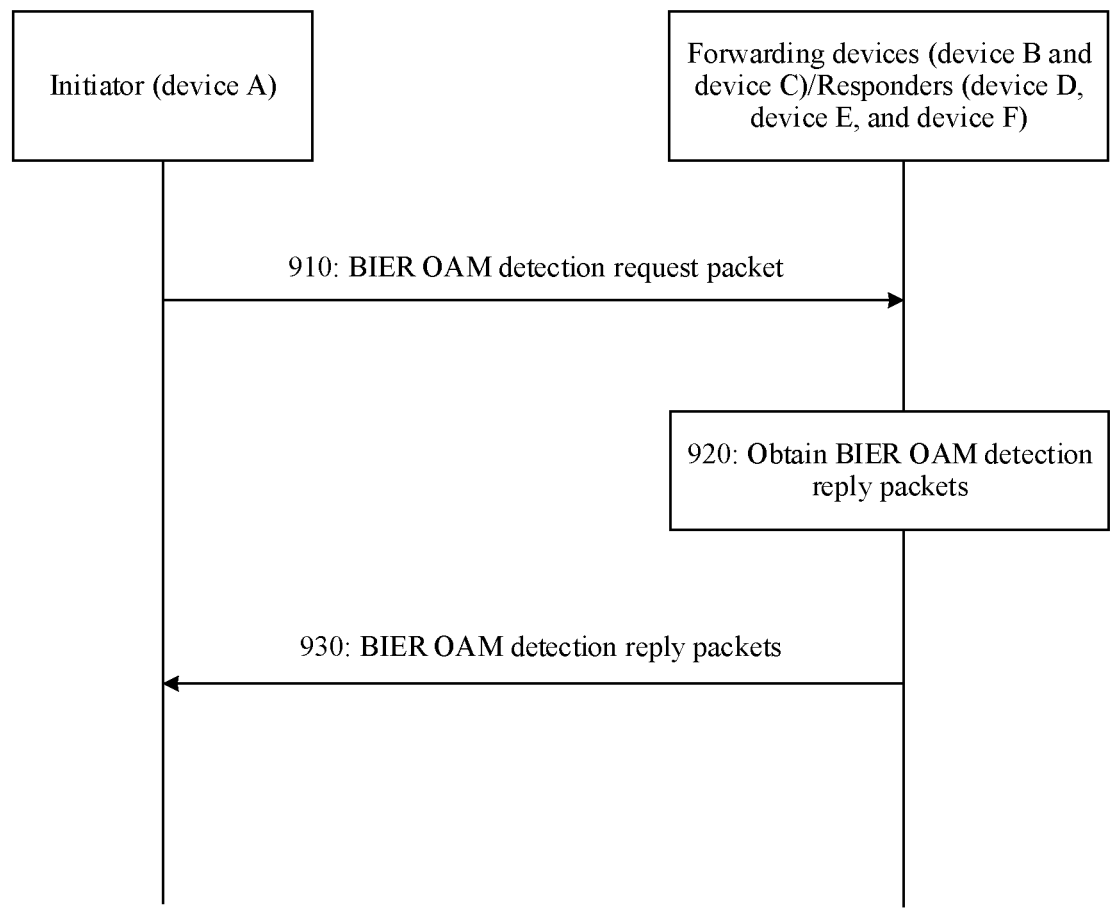
FIG. 9 is a schematic flowchart of Trace detection according to an embodiment of this disclosure.

FIG. 9 is a schematic flowchart of Trace detection according to an embodiment of this disclosure. As shown in FIG. 9, the method may include steps 910 to 930. The following separately describes the steps 910 to 930 in detail.

It should be understood that Trace detection is used to perform hop-by-hop detection on devices in a network.

Step 910: An initiator (a device A) obtains and sends a BIER OAM detection request packet.

The initiator (the device A) encapsulates the BIER OAM detection request packet in the same way as that in Ping detection. As shown in FIG. 8, the BIER OAM detection request packet includes: an IPv6 encapsulated BIER header+ an IPv6 header+a UDP header+a BIER OAM packet.

It should be noted that, because Trace detection is performed hop by hop, in Trace detection, a value of an HL field in the BIER OAM detection request packet starts from 1 and increases with a quantity of sent request packets. In addition, in Trace detection, a downstream mapping TLV needs to be added to a BIER OAM part of the BIER OAM detection request packet, to obtain encapsulated information about a next hop, for example, information about an IP address of the next hop.

Step 920: Forwarding devices (a device B and a device C) or responders (a device D, a device E, and a device F) receive the BIER OAM detection request packet sent by the initiator (the device A), to obtain BIER OAM detection reply packets.

In a possible implementation, after receiving the BIER OAM detection request packet, the forwarding devices (the device B and the device C) or the responders (the device D, the device E, and the device F) may send the BIER OAM detection request packet to control planes of the devices, and the control planes obtain the BIER OAM detection reply packets. For ease of description, an example in which the control planes obtain the BIER OAM detection reply packets is used below for description.

It should be understood that Trace detection is performed hop by hop, and the value of the HL field in the BIER OAM detection request packet starts from 1 and increases with the quantity of sent request packets.

For example, after the forwarding devices (the device B and the device C) receive the BIER OAM detection request packet, time excess does not occur during packet forwarding, the forwarding devices may send the BIER OAM detection request packet to the control planes for processing.

The forwarding devices (the device B and the device C) may encapsulate the BIER OAM detection reply packets on the control planes. The control plane may determine, based on a return mode field in the BIER OAM detection request packet, a mode of returning the BIER OAM detection reply packet. Formats of BIER OAM detection reply packets returned in different modes are different. For details, refer to the format of the BIER OAM detection reply packet encapsulated in the foregoing Ping detection process, and details are not described herein again.

It should be noted that, in Trace detection, in BIER OAM packet, if a value of a return code field is 5, it indicates that the BIER OAM detection request packet is successfully forwarded. The initiator (the device A) may determine, based on a value 5 of return code fields in the BIER OAM detection reply packets, that the initiator (the device A) and the forwarding devices (the device B and the device C) are connected, so as to implement hop-by-hop detection.

It should be further noted that, the device B is used as an example, and in Trace detection, the IP address of the next hop (for example, the device C) may be encapsulated in a downstream mapping TLV in the BIER OAM detection reply packet sent by the device B to the initiator (the device A). Therefore, the initiator (the device A) obtains information about the next hop (for example, the device C) of the device B based on the downstream mapping TLV, and sends the BIER OAM detection request packet to the next hop (for example, the device C) of the device B, thereby implementing detection between the initiator (the device A) and the device C.

In another example, after the responders (the device D, the device E, and the device F) receive the BIER OAM detection request packet, time excess does not occur during packet forwarding, the responders may send the BIER OAM detection request packet to the control planes for processing.

The responders (the device D, the device E, and the device F) may encapsulate the BIER OAM detection reply packets on the control planes. The control plane may determine, based on a return mode field in the BIER OAM detection request packet, a mode of returning the BIER OAM detection reply packet. Formats of BIER OAM detection reply packets returned in different modes are different. For details, refer to the format of the BIER OAM detection reply packet encapsulated in the foregoing Ping detection process, and details are not described herein again.

It should be noted that the responder (the device D, the device E, or the device F) may check whether a bit string in the BIER OAM detection request packet includes the node. For example, if the bit string includes only the node, a value of a return code field may be set to 3. For another example, if the node is only a target BFR in the bit string, a value of a return code field may be set to 4.

It should be further noted that, in Trace detection, the responders (the device D, the device E, and the device F) do not need to update the downstream mapping TLVs in the BIER OAM detection reply packets.

Step 930: The initiator (the device A) receives the BIER OAM detection reply packets, and determines, based on the BIER OAM detection reply packets, whether Trace detection succeeds.

If values of the return code fields in the BIER OAM detection reply packets are 3 or 4, the initiator (the device A) may perform hop-by-hop detection on all the devices (for example, the forwarding devices and the responders).

If the value of the return code field is 4, the initiator (the device A) may clear a corresponding bit in the bit string, update the bit string, copy the Downstream Map TLV in the BIER OAM detection reply packet into a new BIER OAM detection request packet, add 1 to the hop-limit, and continue detection until the initiator receives all reply packets fed back by the responders or until the hop-limit is increased to 255.

Optionally, the method provided in embodiments of this disclosure is further applicable to a scenario of IPv4 network-based BIER-MPLS encapsulation or BIER-ETH encapsulation, is applicable to a scenario of IPv6 network-based BIER-MPLS encapsulation or BIER-ETH encapsulation, or is applicable to a network in which BIERv6 and BIER-MPLS/BIER-ETH are used together.

IPv4 network-based BIER-MPLS encapsulation is used as an example, and the format of the detection request packet obtained by the initiator (the device A) is: an MPLS encapsulated BIER header+an IPv4 header+a UDP header+BIER OAM packet. A destination address of the IPv4 header is a valid IPv4 address that can be identified by at least one BFER.

IPv6 network-based BIER-MPLS encapsulation is used as an example, and the format of the detection request packet obtained by the initiator (the device A) is: an MPLS encapsulated BIER header+an IPv6 header+a UDP header+BIER OAM packet. A destination address of the IPv6 header is a valid IPv6 address that can be identified by at least one BFER.

Figure 10:
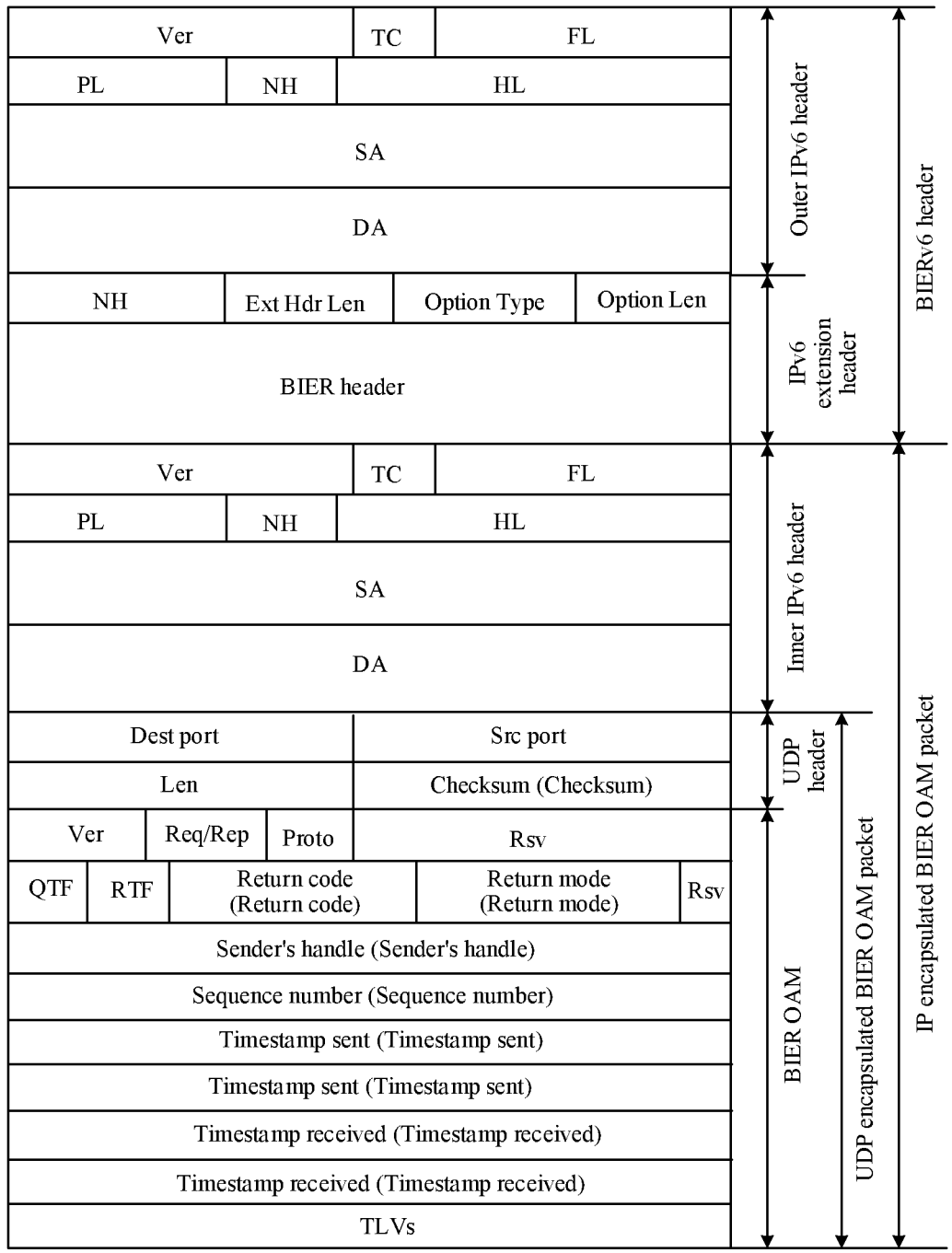
FIG. 10 is a schematic diagram of a format of an IPv6 network-based BIER-MPLS encapsulated BIER OAM detection request packet according to an embodiment of this disclosure.

FIG. 10 is a schematic diagram of a format of an IPv6 network-based BIER-MPLS encapsulated BIER OAM detection request packet according to an embodiment of this disclosure. As shown in FIG. 10, the BIER OAM detection request packet includes: an MPLS encapsulated BIER header+IP encapsulated BIER OAM.

IPv6 network-based BIER-MPLS encapsulation is used as an example, and the IP encapsulated BIER OAM packet includes: an IPv6 header+a UDP header+BIER OAM packet.

The MPLS encapsulated BIER header may be implemented in a plurality of manners. In a possible implementation, the MPLS encapsulated BIER header includes a BIER header, where first four bytes of the BIER header are used to carry or represent an MPLS label. In another possible implementation, the MPLS encapsulated BIER header includes an MPLS label and a BIER header.

The first four bytes of the BIER header are used to carry or represent the MPLS label. This BIER header may also be referred to as a BIER-MPLS header.

FIG. 10 shows only a case in which the first four bytes of the BIER header are used to carry or represent the MPLS label.

Figure 11:
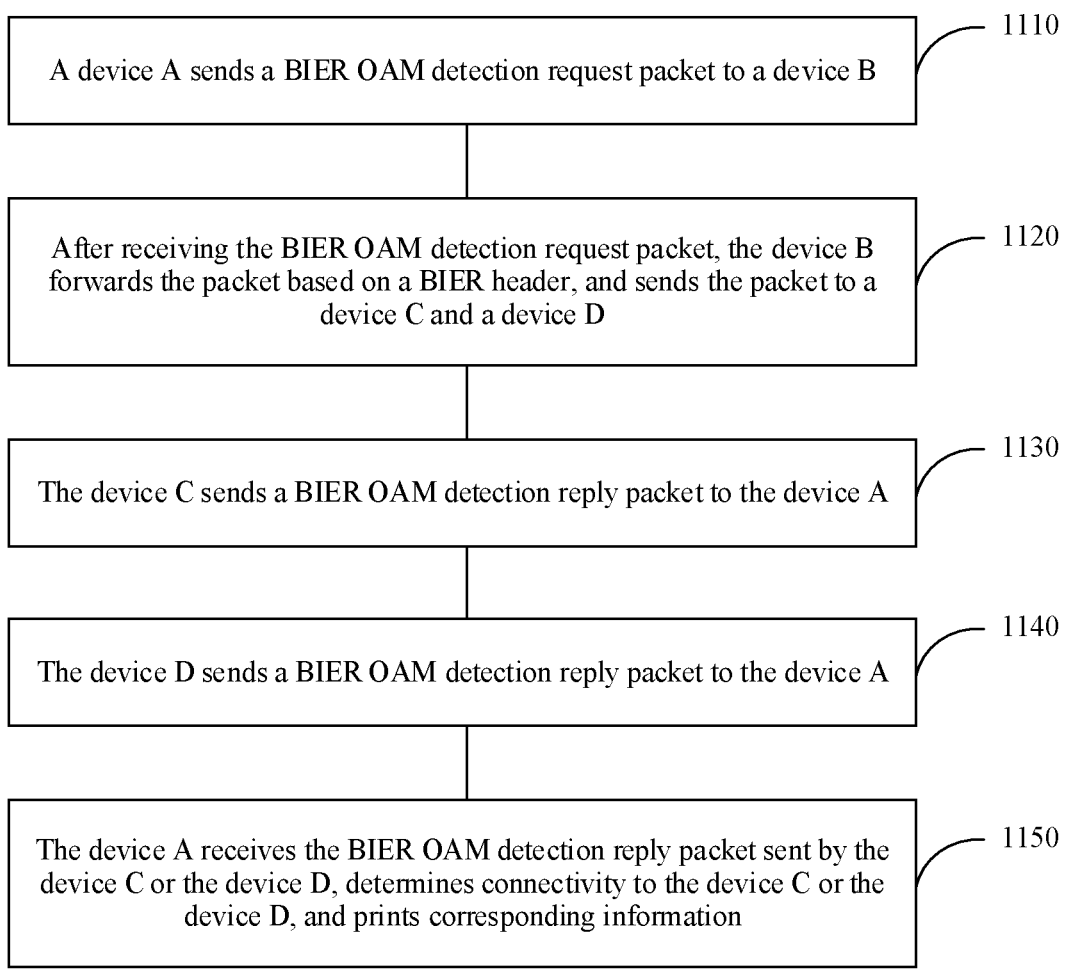
FIG. 11 is a schematic flowchart of another Ping detection according to an embodiment of this disclosure.

The following uses the format shown in FIG. 10 as an example to describe in detail, with reference to FIG. 11, a specific implementation process of another BIER OAM detection method of the methods provided in embodiments of this disclosure.

It should be understood that the following examples are merely intended to help a person skilled in the art understand embodiments of this disclosure, instead of limiting embodiments of this disclosure to a specific numerical value or a specific scenario shown in the examples. Clearly, a person skilled in the art may make various equivalent modifications or changes based on the following examples provided below, and such modifications and changes also fall within the scope of embodiments of this disclosure.

FIG. 11 is a schematic flowchart of another Ping detection according to an embodiment of this disclosure. As shown in FIG. 11, the method may include steps 1110 to 1150. The following separately describes steps 1110 to 1150 in detail.

Step 1110: A device A sends a BIER OAM detection request packet to a device B.

Figure 12:
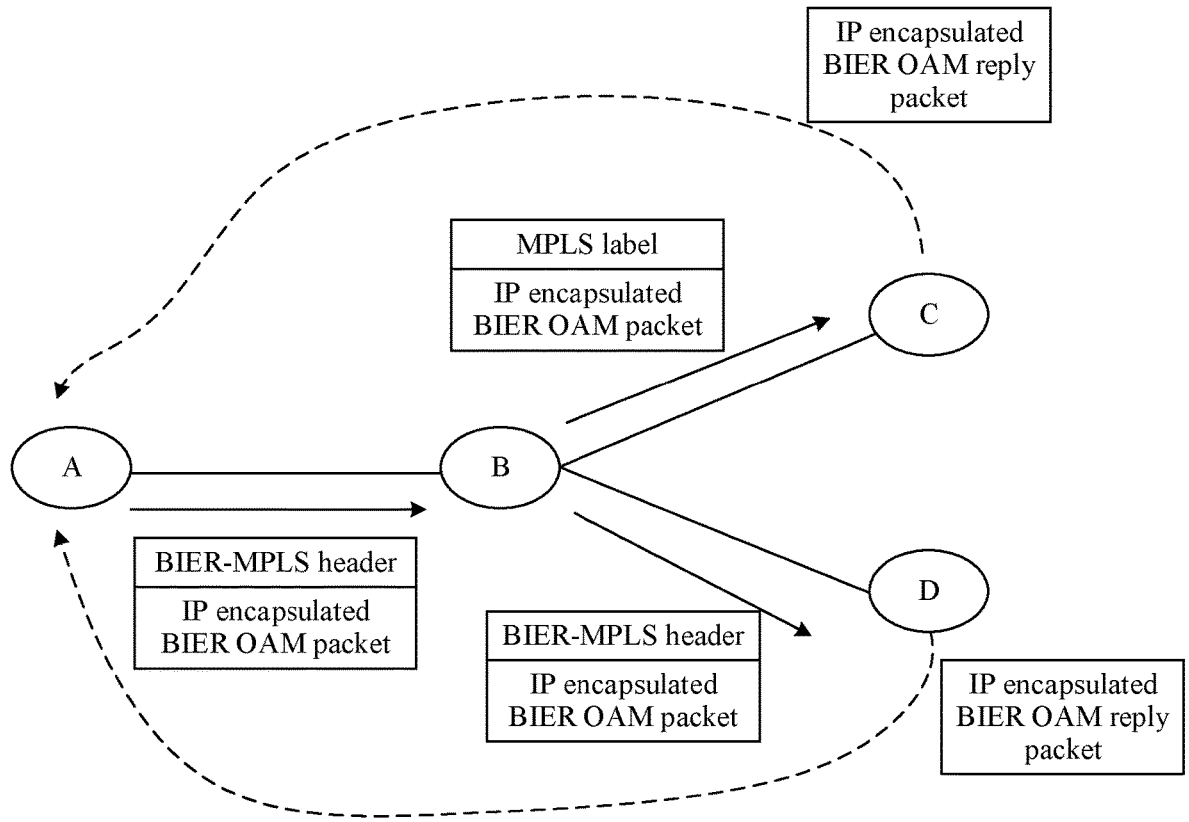
FIG. 12 is a schematic diagram of forwarding a BIER OAM detection request packet based on MPLS according to an embodiment of this disclosure.

The device A can encapsulate a BIER OAM packet in an IP packet to form an IP encapsulated BIER OAM packet, encapsulate the IP encapsulated BIER OAM packet in a BIER-MPLS packet, and send the formed packet to the device B. FIG. 12 shows the packet sent from the device A to the device B.

Step 1120: After receiving the BIER OAM detection request packet, the device B forwards the packet based on a BIER header, and sends the packet to a device C and a device D.

Because the device C is a device that cannot identify the BIER header, the device B displays the BIER-MPLS header when sending the packet to the device C. After the BIER-MPLS header pops up, the device B performs encapsulation with an MPLS label stack, for example, performs encapsulation with a label for reaching the node C.

Because the device D is a device that can identify the BIER-MPLS header, the device B does not display the BIER-MPLS header when sending the packet to the device D, and the packet still carries the BIER-MPLS header. FIG. 12 shows the packets sent from the device B to the devices C and D.

It should be noted that, in a process of establishing BIER multicast forwarding entries between the device A, the device B, the device C, and the device D shown in FIG. 12, the device C and the device D separately indicate, to the device B, whether the device C or the device D can identify the BIER header. If a next hop device of the device B cannot identify the BIER header, the device B needs to display the BIER-MPLS header when sending the packet to the next hop device. If a next hop device of the device B can identify the BIER header, the device B does not need to display the BIER-MPLS header when sending the packet to the next hop device.

Step 1130: The device C sends a BIER OAM detection reply packet to the device A.

After receiving the packet, the device C compares information about a bit string in BIER OAM packet with BFR-id information configured on the device C to determine whether detection subjects of the OAM packet include the device C. If a bit, in the bit string, corresponding to a BFR-id of the device C is 1, the device C sends the BIER OAM detection reply packet to the device A.

For example, the device C sends the BIER OAM detection reply packet to the device A through routing. The BIER OAM detection reply packet may be obtained by performing IP encapsulation on a BIER OAM reply packet. For specific descriptions of IP encapsulation, refer to the foregoing descriptions. Details are not described herein again.

Step 1140: The device D sends a BIER OAM detection reply packet to the device A.

After receiving the packet, the device D compares the information about the bit string in the BIER OAM packet with BFR-id information configured on the device D to determine whether detection subjects of the OAM packet include the device D. If a bit, in the bit string, corresponding to a BFR-id of the device D is 1, the device D sends the BIER OAM detection reply packet to the device A.

For example, the device D sends the BIER OAM detection reply packet to the device A through routing. The BIER OAM detection reply packet may be obtained by performing IP encapsulation on a BIER OAM reply packet. For specific descriptions of IP encapsulation, refer to the foregoing descriptions. Details are not described herein again.

Step 1150: The device A receives the BIER OAM detection reply packet sent by the device C or the device D, determines connectivity to the device C or the device D, and prints corresponding information.

It should be understood that sequence numbers of the foregoing processes do not mean execution sequences in embodiments of this disclosure. The execution sequences of the processes should be determined based on functions and internal logic of the processes, and should not constitute any limitation on implementation processes of embodiments of this disclosure.

The foregoing describes in detail the BIER OAM detection method provided in embodiments of this disclosure with reference to FIG. 1 to FIG. 12. The following describes in detail apparatus embodiments of this disclosure with reference to FIG. 13 to FIG. 18. It should be understood that the descriptions of the method embodiments correspond to descriptions of the apparatus embodiments. Therefore, for parts that are not described in detail, refer to the descriptions in the foregoing method embodiments.

Figure 13:
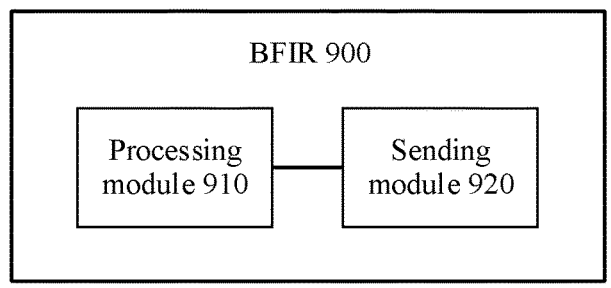
FIG. 13 is a schematic diagram of a structure of a BFIR according to an embodiment of this disclosure.

FIG. 13 is a schematic diagram of a structure of a BFIR 900 according to an embodiment of this disclosure. The BFIR 900 shown in FIG. 13 may perform corresponding steps that are performed by the BFIR in the method in the foregoing embodiments. As shown in FIG. 13, the BFIR 900 includes a processing module 910 and a sending module 920.

The processing module 910 is configured to obtain a detection request packet based on a first BIER OAM packet, where the detection request packet includes a first packet and a first packet header, the first packet is a packet obtained by encapsulating the first BIER OAM packet, the first packet header includes a bit string, and the bit string indicates at least one bit forwarding egress router BFER that is to be measured.

The sending module 920 is configured to send the detection request packet to the at least one BFER.

Optionally, the first packet header includes a first identifier indicating that the encapsulation is IPv6 encapsulation, the first packet includes a first IPv6 header and the first BIER OAM packet, and a destination address of the first IPv6 header is a valid address that can be identified by the at least one BFER.

Optionally, the first packet header includes a first identifier indicating that the encapsulation is IPv4 encapsulation, the first packet includes a first IPv4 header and the first BIER OAM packet, and a destination address of the first IPv4 header is a valid address that can be identified by the at least one BFER.

Optionally, the first packet header includes a first identifier indicating that the encapsulation is IPv6 encapsulation, the first packet includes a first IPv6 header and a UDP encapsulated BIER OAM packet, a destination address of the first IPv6 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

Optionally, the first packet header includes a first identifier indicating that the encapsulation is IPv4 encapsulation, the first packet includes a first IPv4 header and a UDP encapsulated BIER OAM packet, a destination address of the first IPv4 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

Optionally, the first packet header includes an IPv6 encapsulated BIER header, and the IPv6 encapsulated BIER header includes a second IPv6 header and a first identifier indicating that the encapsulation is IP encapsulation.

Optionally, the first packet header includes an MPLS encapsulated BIER header, and the MPLS encapsulated BIER header includes an MPLS label and a first identifier indicating that the encapsulation is IP encapsulation.

Optionally, the first packet header includes an Ethernet encapsulated BIER header, and the Ethernet encapsulated BIER header includes a first identifier indicating that the encapsulation is IP encapsulation.

Optionally, the BFIR 900 further includes: a receiving module 930, configured to receive a detection reply packet from the at least one BFER, where the detection reply packet includes a second packet, and the second packet is a packet obtained by encapsulating a second BIER OAM packet.

Optionally, the second packet includes a third IPv6 header and the second BIER OAM packet, and a source address of the third IPv6 header is a valid address that can be identified by the at least one BFER.

Optionally, the second packet includes a second IPv4 header and the second BIER OAM packet, and a source address of the second IPv4 header is a valid address that can be identified by the at least one BFER.

Optionally, the second packet includes a third IPv6 header and a UDP encapsulated BIER OAM packet, a source address of the third IPv6 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

Optionally, the second packet includes a second IPv4 header and a UDP encapsulated BIER OAM packet, a source address of the second IPv4 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

Optionally, the detection reply packet further includes a second packet header, and the second packet header includes a second identifier indicating that the encapsulation is IP encapsulation.

Optionally, the second packet header includes an IPv6 encapsulated BIER header, and the IPv6 encapsulated BIER header includes a second IPv6 header and the second identifier.

Optionally, the second packet header includes an MPLS encapsulated BIER header, and the MPLS encapsulated BIER header includes an MPLS label and the second identifier.

Optionally, the second packet header includes an Ethernet encapsulated BIER header, and the Ethernet encapsulated BIER header includes the second identifier.

Figure 14:
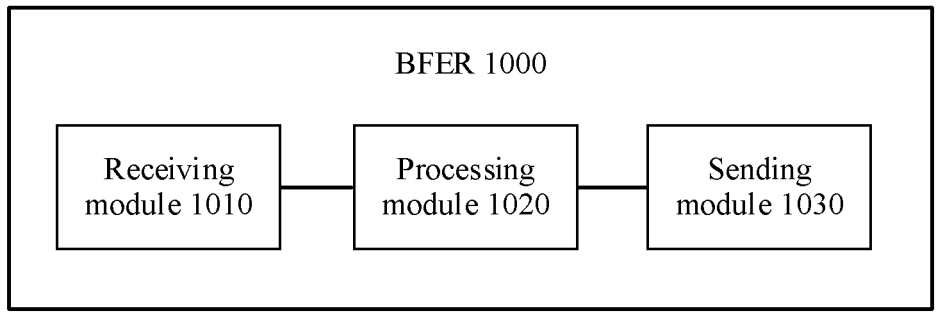
FIG. 14 is a schematic diagram of a structure of a BFER according to an embodiment of this disclosure.

FIG. 14 is a schematic diagram of a structure of a BFER 1000 according to an embodiment of this disclosure. The BFER 1000 shown in FIG. 14 may perform corresponding steps that are performed by the BFER in the method in the foregoing embodiments. As shown in FIG. 14, the BFER 1000 includes a receiving module 1010, a processing module 1020, and a sending module 1030.

The receiving module 1010 is configured to receive a detection request packet from a bit forwarding ingress router BFIR, where the detection request packet includes a first packet and a first packet header, the first packet is a packet obtained by encapsulating a first BIER OAM packet, the first packet header includes a bit string, and the bit string indicates at least one BFER that is to be measured.

The processing module 1020 is configured to obtain a detection reply packet based on the first packet and the bit string, where the detection reply packet includes a second packet, and the second packet is a packet obtained by encapsulating a second BIER OAM packet.

The sending module 1030 is configured to send the detection reply packet to the BFIR.

Optionally, the first packet header includes a first identifier indicating that the encapsulation is IPv6 encapsulation, the first packet includes a first IPv6 header and the first BIER OAM packet, and a destination address of the first IPv6 header is a valid address that can be identified by the at least one BFER.

Optionally, the first packet header includes a first identifier indicating that the encapsulation is IPv4 encapsulation, the first packet includes a first IPv4 header and the first BIER OAM packet, and a destination address of the first IPv4 header is a valid address that can be identified by the at least one BFER.

Optionally, the first packet header includes a first identifier indicating that the encapsulation is IPv6 encapsulation, the first packet includes a first IPv6 header and a UDP encapsulated BIER OAM packet, a destination address of the first IPv6 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

Optionally, the first packet header includes a first identifier indicating that the encapsulation is IPv4 encapsulation, the first packet includes a first IPv4 header and a UDP encapsulated BIER OAM packet, a destination address of the first IPv4 header is a valid address that can be identified by the at least one BFER, the UDP encapsulated BIER OAM packet includes a UDP header and the first BIER OAM packet, and a destination port included in the UDP header indicates a listening port of the BFER that receives the detection request packet.

Optionally, the first packet header includes an IPv6 encapsulated BIER header, and the IPv6 encapsulated BIER header includes a second IPv6 header and a first identifier indicating that the encapsulation is IP encapsulation.

Optionally, the first packet header includes an MPLS encapsulated BIER header, and the MPLS encapsulated BIER header includes an MPLS label and a first identifier indicating that the encapsulation is IP encapsulation.

Optionally, the first packet header includes an Ethernet encapsulated BIER header, and the Ethernet encapsulated BIER header includes a first identifier indicating that the encapsulation is IP encapsulation.

Optionally, the second packet includes a third IPv6 header and the second BIER OAM packet, and a source address of the third IPv6 header is a valid address that can be identified by the at least one BFER.

Optionally, the second packet includes a second IPv4 header and the second BIER OAM packet, and a source address of the second IPv4 header is a valid address that can be identified by the at least one BFER.

Optionally, the second packet includes a third IPv6 header and a UDP encapsulated BIER OAM packet, a source address of the third IPv6 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

Optionally, the second packet includes a second IPv4 header and a UDP encapsulated BIER OAM packet, a source address of the second IPv4 header is a valid address that can be identified by the at least one BFER, the UDP encapsulated BIER OAM packet includes a UDP header and the second BIER OAM packet, and a source port number included in the UDP header indicates a listening port of the BFER that receives the detection request packet.

Optionally, the detection reply packet further includes a second packet header, and the second packet header includes a second identifier indicating that the encapsulation is IP encapsulation.

Optionally, the second packet header includes an IPv6 encapsulated BIER header, and the IPv6 encapsulated BIER header includes a second IPv6 header and the second identifier.

Optionally, the second packet header includes an MPLS encapsulated BIER header, and the MPLS encapsulated BIER header includes an MPLS label and the second identifier.

Optionally, the second packet header includes an Ethernet encapsulated BIER header, and the Ethernet encapsulated BIER header includes the second identifier.

Figure 15:
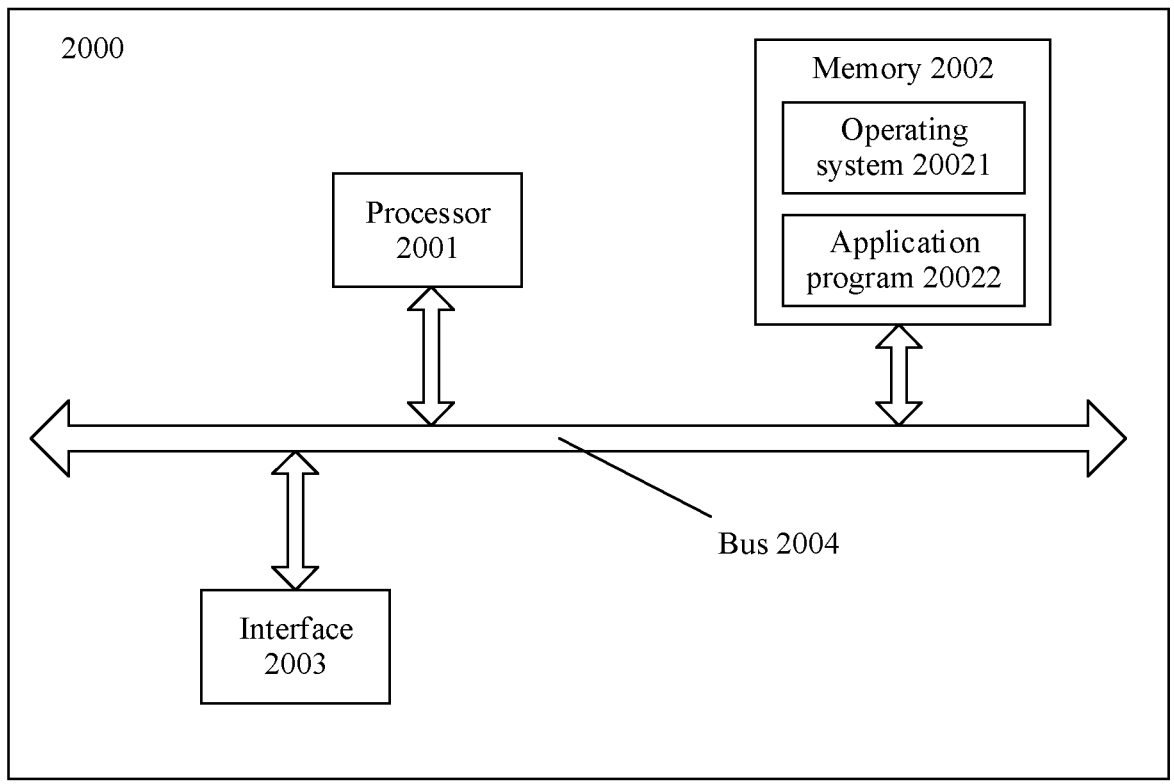
FIG. 15 is a schematic diagram of a hardware structure of a BFIR according to an embodiment of this disclosure.

FIG. 15 is a schematic diagram of a hardware structure of a BFIR 2000 according to an embodiment of this disclosure. The BFIR 2000 shown in FIG. 15 may perform corresponding steps that are performed by the BFIR in the method in the foregoing embodiments.

As shown in FIG. 15, the BFIR 2000 includes a processor 2001, a memory 2002, an interface 2003, and a bus 2004. The interface 2003 may be implemented in a wireless or wired manner, and may be a network adapter. The processor 2001, the memory 2002, and the interface 2003 are connected through the bus 2004.

The interface 2003 may include a transmitter and a receiver, and is used by the BFIR to implement the foregoing receiving and sending. For example, the interface 2003 is configured to support the BFIR in sending a detection request packet to at least one bit forwarding egress router BFER.

The processor 2001 is configured to perform processing performed by the BFIR in the foregoing embodiments. For example, the processor 2001 is configured to obtain the detection request packet based on a first BIER OAM packet; and/or configured to perform another process of the technology described in this specification. The memory 2002 includes an operating system 20021 and an application program 20022, and is configured to store a program, code, or instructions. When executing the program, code, or instructions, the processor or a hardware device may complete a processing process of the BFIR in the foregoing method embodiments. Optionally, the memory 2002 may include a ROM and a RAM. The ROM includes a basic input/output system (BIOS) or an embedded system, and the RAM includes an application program and an operating system. When the BFIR 2000 needs to run, the BFIR 2000 is started by using a bootloader booting system in the BIOS or the embedded system that is built into the ROM, to boot the BFIR 2000 to enter a normal running state. After entering the normal running state, the BFIR 2000 runs the application program and the operating system in the RAM, to complete the processing process of the BFIR 2000 in the method embodiments.

It can be understood that, FIG. 15 shows only a simplified design of the BFIR 2000. In actual application, the BFIR may include any quantity of interfaces, processors, or memories.

Figure 16:
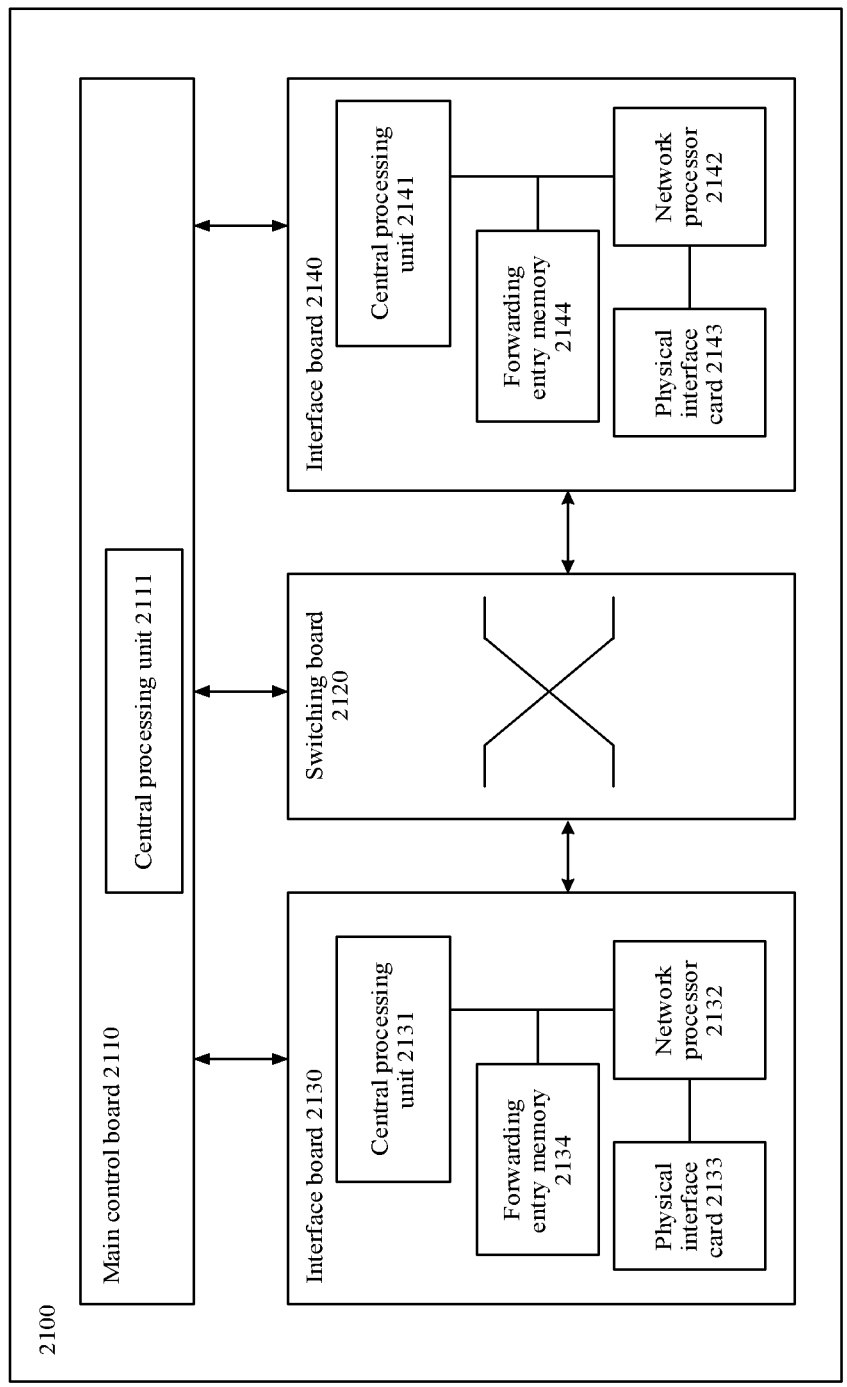
FIG. 16 is a schematic diagram of a hardware structure of another BFIR according to an embodiment of this disclosure.

FIG. 16 is a schematic diagram of a hardware structure of another BFIR 2100 according to an embodiment of this disclosure. The BFIR 2100 shown in FIG. 16 may perform corresponding steps that are performed by the BFIR in the method in the foregoing embodiments.

As shown in FIG. 16, the BFIR 2100 includes a main control board 2110, an interface board 2130, a switching board 2120, and an interface board 2140. The main control board 2110, the interface board 2130, the interface board 2140, and the switching board 2120 are connected to a platform backboard through a system bus for interworking. The main control board 2110 is configured to complete functions such as system management, device maintenance, and protocol processing. The switching board 2120 is configured to exchange data between interface boards (where the interface board is also referred to as a line card or a service board). The interface boards 2130 and 2140 are configured to: provide various service interfaces (such as a point-of-sale (POS) interface, a Gigabit Ethernet interface, and an Asynchronous Transfer Mode (ATM) interface), and forward a data packet.

The interface board 2130 may include a central processing unit 2131, a forwarding entry memory 2134, a physical interface card 2133, and a network processor 2132. The central processing unit 2131 is configured to: control and manage the interface board, and communicate with a central processing unit on the main control board. The forwarding entry memory 2134 is configured to store an entry, for example, the foregoing BIFT entry. The physical interface card 2133 is configured to receive and send traffic.

It should be understood that an operation on the interface board 2140 is consistent with an operation on the interface board 2130 in this embodiment of this disclosure. For brevity, details are not described again.

It should be understood that the BFIR 2100 in this embodiment may correspond to the functions and/or the various implemented steps in the foregoing method embodiments. Details are not described herein again.

In addition, it should be noted that there may be one or more main control boards. When there are a plurality of main control boards, the main control boards may include an active main control board and a standby main control board. There may be one or more interface boards, and a BFIR having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the BFIR may not need the switching board, and the interface board provides a function of processing service data of an entire system. In a distributed forwarding architecture, the BFIR may have at least one switching board, and exchange data between a plurality of interface boards via the switching board, to provide a large-capacity data exchange and processing capability. Therefore, a data access and processing capability of the BFIR of the distributed architecture is better than that of the device of the centralized architecture. A specific architecture that is to be used depends on a specific networking deployment scenario. This is not limited herein.

Figure 17:
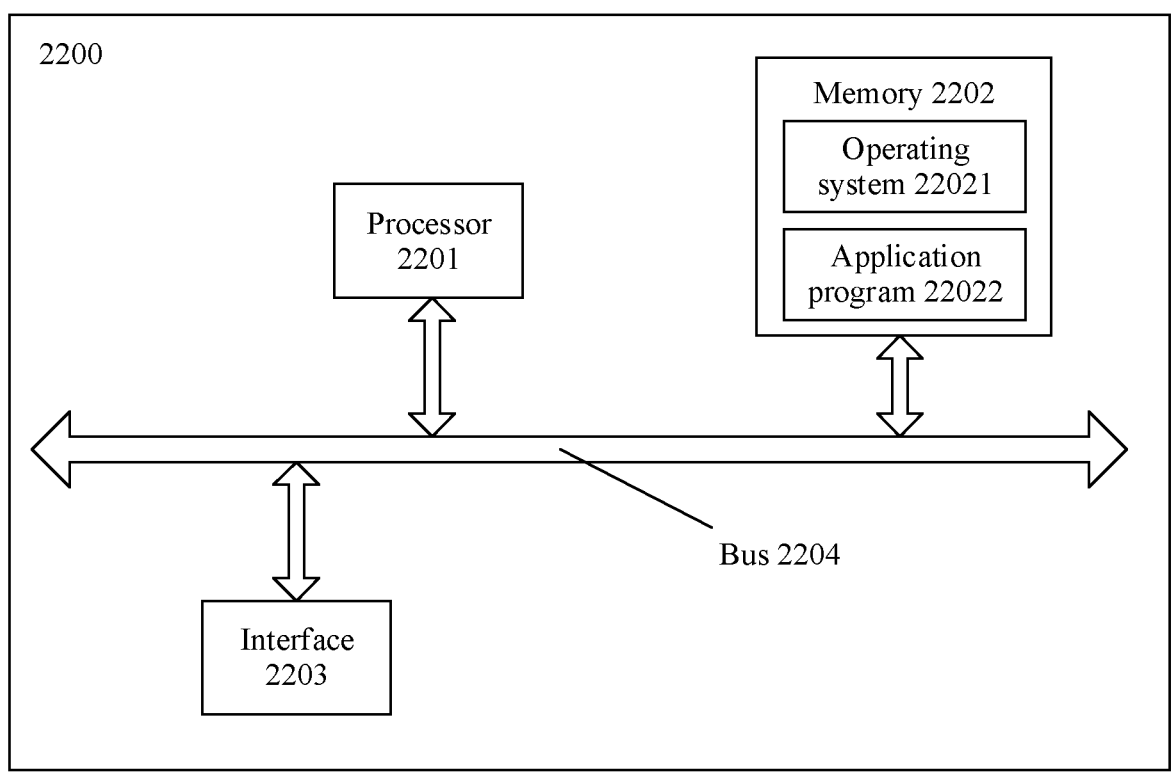
FIG. 17 is a schematic diagram of a hardware structure of a BFER according to an embodiment of this disclosure.

FIG. 17 is a schematic diagram of a hardware structure of a BFER 2200 according to an embodiment of this disclosure. The BFER 2200 shown in FIG. 17 may perform corresponding steps that are performed by the BFER in the method in the foregoing embodiments.

As shown in FIG. 17, the BFER 2200 includes a processor 2201, a memory 2202, an interface 2203, and a bus 2204. The interface 2203 may be implemented in a wireless or wired manner, and may be a network adapter. The processor 2201, the memory 2202, and the interface 2203 are connected through the bus 2204.

The interface 2203 may include a transmitter and a receiver, and is used by the BFER to implement the foregoing receiving and sending. For example, the interface is configured to support receiving of a detection request packet from a bit forwarding ingress router BFIR. For another example, the interface 2203 is configured to support sending of a detection reply packet to the BFIR.

The processor 2201 is configured to perform processing performed by the BFER in the foregoing embodiments. For example, the processor 2201 is configured to obtain the detection reply packet based on a first BIER OAM packet; and/or configured to perform another process of the technology described in this specification. The memory 2202 includes an operating system 22021 and an application program 22022, and is configured to store a program, code, or instructions. When executing the program, code, or instructions, the processor or a hardware device may complete a processing process of the BFER in the foregoing method embodiments. Optionally, the memory 2202 may include a ROM and a RAM. The ROM includes a basic input/output system (BIOS) or an embedded system, and the RAM includes an application program and an operating system. When the BFER 2200 needs to run, the BFER 2200 is started by using a bootloader booting system in the BIOS or the embedded system that is built into the ROM, to boot the BFER 2200 to enter a normal running state. After entering the normal running state, the BFER 2200 runs the application program and the operating system in the RAM, to complete the processing process of the BFER 2200 in the method embodiments.

It can be understood that FIG. 17 shows only a simplified design of the BFER 2200. In actual application, the BFER may include any quantity of interfaces, processors, or memories.

Figure 18:
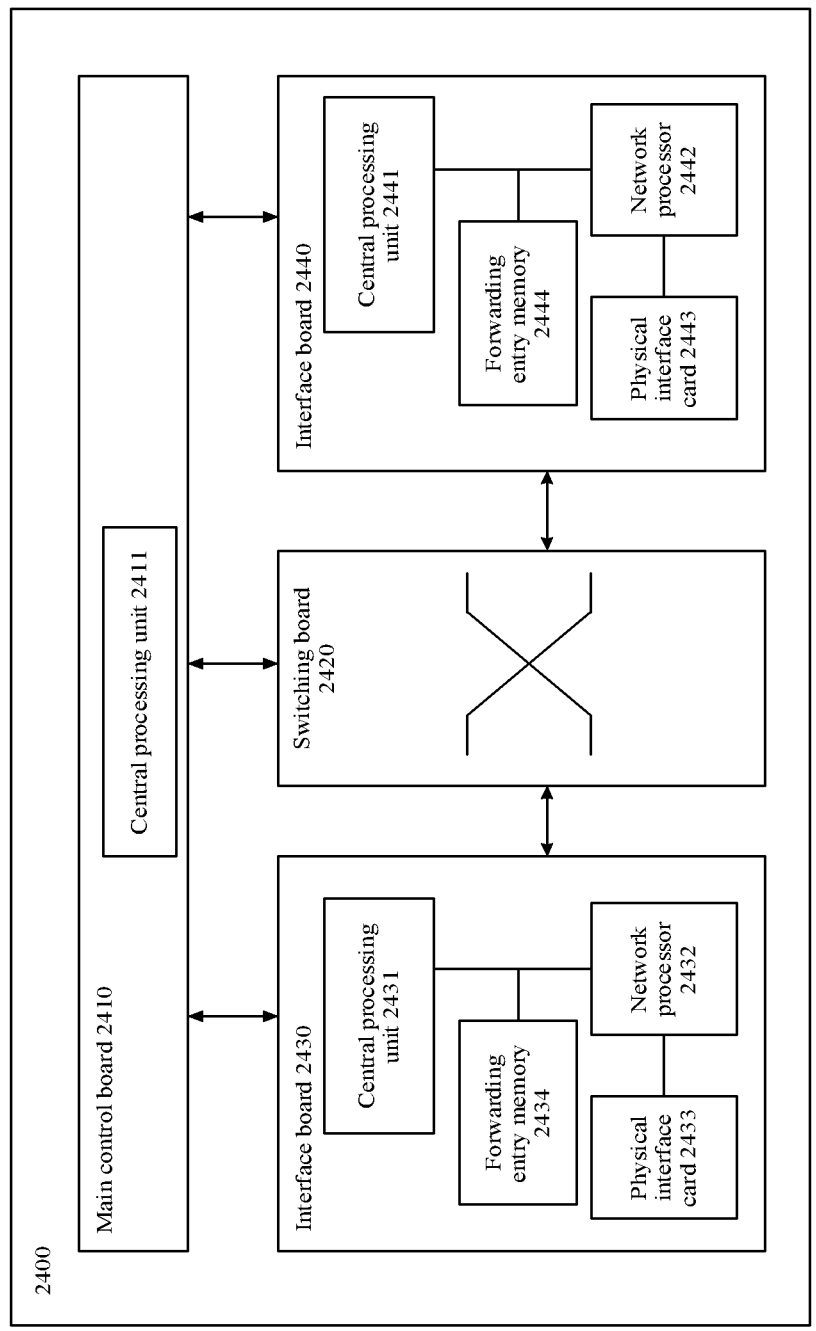
FIG. 18 is a schematic diagram of a hardware structure of another BFER according to an embodiment of this disclosure.

FIG. 18 is a schematic diagram of a hardware structure of another BFER 2400 according to an embodiment of this disclosure. The BFER 2400 shown in FIG. 18 may perform corresponding steps that are performed by the BFER in the method in the foregoing embodiments.

As shown in FIG. 18, the BFER 2400 includes a main control board 2410, an interface board 2430, a switching board 2420, and an interface board 2440. The main control board 2410, the interface board 2430, the interface board 2440, and the switching board 2420 are connected to a platform backboard through a system bus for interworking. The main control board 2410 is configured to complete functions such as system management, device maintenance, and protocol processing. The switching board 2420 is configured to exchange data between interface boards (where the interface board is also referred to as a line card or a service board). The interface boards 2430 and 2440 are configured to: provide various service interfaces (such as a POS interface, a GE interface, and an ATM interface), and forward a data packet.

The interface board 2430 may include a central processing unit 2431, a forwarding entry memory 2434, a physical interface card 2433, and a network processor 2432. The central processing unit 2431 is configured to: control and manage the interface board, and communicate with a central processing unit on the main control board. The forwarding entry memory 2434 is configured to store an entry, for example, the foregoing BIFT. The physical interface card 2433 is configured to receive and send traffic.

It should be understood that an operation on the interface board 2440 is consistent with an operation on the interface board 2430 in this embodiment of this disclosure. For brevity, details are not described again. It should be understood that the BFER 2400 in this embodiment may correspond to the functions and/or the various implemented steps in the foregoing method embodiments. Details are not described herein again.

In addition, it should be noted that there may be one or more main control boards. When there are a plurality of main control boards, the main control boards may include an active main control board and a standby main control board. There may be one or more interface boards, and a BFER having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the BFER may not need the switching board, and the interface board provides a function of processing service data of an entire system. In a distributed forwarding architecture, the BFER may have at least one switching board, and exchange data between a plurality of interface boards via the switching board, to provide a large-capacity data exchange and processing capability. Therefore, a data access and processing capability of the BFER of the distributed architecture is better than that of the device of the centralized architecture. A specific architecture that is to be used depends on a specific networking deployment scenario. This is not limited herein.

An embodiment of this disclosure further provides a computer-readable medium. The computer-readable medium stores program code. When the computer program code is run on a computer, the computer is enabled to perform the foregoing method performed by the BFIR. The computer-readable medium includes but is not limited to one or more of the following: a ROM, a PROM, an EPROM, a flash memory, an EEPROM, and a hard drive.

An embodiment of this disclosure further provides a computer-readable medium. The computer-readable medium stores program code. When the computer program code is run on a computer, the computer is enabled to perform the foregoing method performed by the BFER. The computer-readable medium includes but is not limited to one or more of the following: a ROM, a PROM, an EPROM, a flash memory, an EEPROM, and a hard drive.

An embodiment of this disclosure further provides a chip system, used in a BFIR. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions. The instructions are executed by the at least one processor to perform an operation of the BFIR in the method in the foregoing aspects.

In a specific implementation process, the chip may be implemented in a form of a CPU, an MCU, a DSP, an SoC, an ASIC, a FPGA, or a PLD.

An embodiment of this disclosure further provides another chip system, used in a BFER. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions. The instructions are executed by the at least one processor to perform an operation of the BFER in the method in the foregoing aspects.

In a specific implementation process, the chip may be implemented in a form of a CPU, an MCU, a DSP, an SoC, an ASIC, a FPGA, or a PLD.

An embodiment of this disclosure further provides a computer program product, used in a BFIR. The computer program product includes a series of instructions. When the instructions are run, an operation of the BFIR in the method in the foregoing aspects is performed.

An embodiment of this disclosure further provides a computer program product, used in a BFER. The computer program product includes a series of instructions. When the instructions are run, an operation of the BFER in the method in the foregoing aspects is performed.

An embodiment of this disclosure further provides a system, including the foregoing BFIR and BFER.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatuses, and units, refer to a corresponding process in the foregoing method embodiments, and details are not described herein again.

In the several embodiments provided in this disclosure, it should be understood that the disclosed system, apparatuses, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in embodiments.

In addition, functional units in embodiments of this disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this disclosure essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the method described in embodiments of this disclosure. The foregoing storage medium includes: any medium that can store program code, for example, a USB flash drive, a removable hard disk, a ROM, a RAM, a magnetic disk, or an optical disc.

The foregoing descriptions are merely specific implementations of this disclosure, but the protection scope of this disclosure is not limited thereto. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, comprising:
obtaining, based on a first bit index explicit replication (BIER) operations, administration, and maintenance (OAM) packet, a detection request packet, wherein the detection request packet comprises a first packet, a first packet header, and a second packet header, wherein the first packet is based on encapsulation of the first BIER OAM packet, wherein the first packet header comprises a bit string, wherein the bit string indicates a bit forwarding egress router (BFER) that is to be measured, wherein the first packet comprises a first destination address that is a valid address that can be identified by the BFER, wherein the second packet header comprises a second destination address that is a next hop for BIER forwarding, wherein the first destination address is configured to not be updated, and wherein the second destination address is configured to be continually updated; and
sending the detection request packet to the BFER.

2. The method of claim 1, wherein the first packet header comprises a first identifier indicating that the first packet is encapsulated using Internet Protocol (IP) encapsulation, wherein the first packet comprises a first IP header and the first BIER OAM packet, and wherein the first IP header comprises the first destination address that can be identified by the BFER.

3. The method of claim 2, wherein the IP encapsulation is IP version 6 (IPv6) encapsulation, and wherein the first IP header is an IPv6 header.

4. The method of claim 2, wherein the IP encapsulation is IP version 4 (IPv4) encapsulation, and wherein the first IP header is an IPv4 header.

5. The method of claim 1, wherein the first packet header comprises a first identifier indicating that the first packet is encapsulated using Internet Protocol (IP) encapsulation, wherein the first packet comprises a first IP header, a first User Datagram Protocol (UDP) header, and the first BIER OAM packet, wherein the first IP header comprises the first destination address that can be identified by the BFER, and wherein a destination port comprised in the first UDP header indicates a listening port of the BFER for receiving the detection request packet.

6. The method of claim 1, wherein the first packet header comprises an Internet Protocol version 6 (IPv6) encapsulated BIER header, and wherein the IPv6 encapsulated BIER header comprises an IPv6 header and a first identifier indicating that the first packet is encapsulated using Internet Protocol encapsulation.

7. The method of claim 1, further comprising receiving a detection reply packet from the BFER, wherein the detection reply packet comprises a second packet, and wherein the second packet is from encapsulating a second BIER OAM packet.

8. The method of claim 7, wherein the second packet comprises a second IP header and the second BIER OAM packet, and wherein the second IP header comprises a source address that can be identified by the BFER.

9. The method of claim 7, wherein the second packet comprises a second IP header, a second User Datagram Protocol (UDP) header, and the second BIER OAM packet, wherein the second IP header comprises a source address that can be identified by the BFER, and wherein a source port number comprised in the second UDP header indicates a listening port of the BFER for receiving the detection request packet.

10. The method of claim 1, wherein the first packet header comprises a Multiprotocol Label Switching (MPLS) encapsulated BIER header, and wherein the MPLS encapsulated BIER header comprises an MPLS label and a first identifier indicating that the first packet is encapsulated using Internet Protocol (IP) encapsulation.

11. The method of claim 1, wherein the first packet header comprises an Ethernet encapsulated BIER header, and wherein the Ethernet encapsulated BIER header comprises a first identifier indicating that the first packet is encapsulated using Internet Protocol (IP) encapsulation.

12. An apparatus, comprising:
a memory configured to store instructions; and
one or more processors coupled to the memory and configured to execute the instructions to:
    obtain, based on a first bit index explicit replication (BIER) operations, administration, and maintenance (OAM) packet, a detection request packet, wherein the detection request packet comprises a first packet, a first packet header, and a second packet header, wherein the first packet is based on encapsulation of the first BIER OAM packet, wherein the first packet header comprises a bit string, wherein the bit string indicates a bit forwarding egress router (BFER) that is to be measured, wherein the first packet comprises a first destination address that is a valid address that can be identified by the BFER, wherein the second packet header comprises a second destination address that is a next hop for BIER forwarding, wherein the first destination address is configured to not be updated, and wherein the second destination address is configured to be continually updated; and
    send the detection request packet to the BFER.

13. The apparatus of claim 12, wherein the first packet header comprises a first identifier indicating that the first packet is encapsulated using Internet Protocol (IP) encapsulation, wherein the first packet comprises a first IP header and the first BIER OAM packet, and wherein the first IP header comprises the first destination address that can be identified by the BFER.

14. The apparatus of claim 13, wherein the IP encapsulation is IP version 6 (IPv6) encapsulation, and the first IP header is an IPv6 header, or wherein the IP encapsulation is IP version 4 (IPv4) encapsulation, and the first IP header is an IPv4 header.

15. The apparatus of claim 12, wherein the first packet header comprises a first identifier indicating that the first packet is encapsulated using Internet Protocol (IP) encapsulation, wherein the first packet comprises a first IP header, a first User Datagram Protocol (UDP) header, and the first BIER OAM packet, wherein the first IP header comprises the first destination address that can be identified by the BFER, and wherein a destination port comprised in the first UDP header indicates a listening port of the BFER for receiving the detection request packet.

16. The apparatus of claim 12, wherein the first packet header comprises an Internet Protocol version 6 (IPv6) encapsulated BIER header, and the IPv6 encapsulated BIER header comprises an IPv6 header and a first identifier indicating that the first packet is encapsulated using Internet Protocol (IP) encapsulation, wherein the first packet header comprises a Multiprotocol Label Switching (MPLS) encapsulated BIER header, and the MPLS encapsulated BIER header comprises an MPLS label and the first identifier, or wherein the first packet header comprises an Ethernet encapsulated BIER header, and the Ethernet encapsulated BIER header comprises the first identifier.

17. The apparatus of claim 12, wherein the one or more processors are further configured to execute the instructions to receive a detection reply packet from the BFER, wherein the detection reply packet comprises a second packet, and wherein the second packet is from encapsulating a second BIER OAM packet.

18. The apparatus of claim 17, wherein the second packet comprises a second IP header and the second BIER OAM packet, and wherein the second IP header comprises a source address that can be identified by the BFER.

19. The apparatus of claim 17, wherein the second packet comprises a second IP header, a second User Datagram Protocol (UDP) header, and the second BIER OAM packet, wherein the second IP header comprises a source address that can be identified by the BFER, and wherein a source port number comprised in the second UDP header indicates a listening port of the BFER for receiving the detection request packet.

20. A computer program product comprising instructions stored on a non-transitory computer-readable medium that, when executed by one or more processors, cause an apparatus to:
    obtain, based on a first bit index explicit replication (BIER) operations, administration, and maintenance (OAM) packet, a detection request packet, wherein the detection request packet comprises a first packet, a first packet header, and a second packet header, wherein the first packet is based on encapsulation of the first BIER OAM packet, wherein the first packet header comprises a bit string, wherein the bit string indicates a bit forwarding egress router (BFER) that is to be measured, wherein the first packet comprises a first destination address that is a valid address that can be identified by the BFER, wherein the second packet header comprises a second destination address that is a next hop for BIER forwarding, wherein the first destination address is configured to not be updated, and wherein the second destination address is configured to be continually updated; and send the detection request packet to the BFER.

* * * * *